(12) United States Patent
Yin et al.

(10) Patent No.: US 9,036,491 B2
(45) Date of Patent: May 19, 2015

(54) DEVICES FOR CONVERTING A DOWNLINK SUBFRAME

(75) Inventors: Zhanping Yin, Vancouver, WA (US); Shohei Yamada, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 424 days.

(21) Appl. No.: 13/208,529

(22) Filed: Aug. 12, 2011

(65) Prior Publication Data

US 2013/0039193 A1 Feb. 14, 2013

(51) Int. Cl.
*H04L 12/26* (2006.01)
*H04W 72/04* (2009.01)

(52) U.S. Cl.
CPC .................... *H04W 72/0486* (2013.01)

(58) Field of Classification Search
None
See application file for complete search history.

(56) References Cited

U.S. PATENT DOCUMENTS

| | | |
|---|---|---|
| 2009/0135748 A1 | 5/2009 | Lindoff et al. |
| 2009/0201838 A1 | 8/2009 | Zhang et al. |
| 2009/0249153 A1 | 10/2009 | Zhang |
| 2009/0274071 A1 | 11/2009 | Ramesh et al. |
| 2010/0189081 A1 | 7/2010 | Zhang et al. |
| 2010/0238847 A1 | 9/2010 | Suo et al. |
| 2010/0246456 A1 | 9/2010 | Suo et al. |
| 2010/0278083 A1 | 11/2010 | Kwak et al. |
| 2011/0032855 A1 | 2/2011 | Kim et al. |
| 2011/0176461 A1* | 7/2011 | Astely et al. ............ 370/280 |
| 2011/0211503 A1* | 9/2011 | Che et al. ............... 370/280 |
| 2012/0120854 A1* | 5/2012 | Zhang et al. ........... 370/280 |
| 2012/0134316 A1* | 5/2012 | Seo et al. ............... 370/315 |
| 2012/0155338 A1* | 6/2012 | Noh et al. .............. 370/280 |
| 2013/0242821 A1* | 9/2013 | Wei et al. .............. 370/280 |

FOREIGN PATENT DOCUMENTS

| | | |
|---|---|---|
| WO | 2009/035399 | 3/2009 |
| WO | 2011/044494 | 4/2011 |
| WO | 2012/046505 | 4/2012 |

OTHER PUBLICATIONS

Sharp, "Fast Uplink-Downlink Re-configuration with Traffic Adaptation by PHY Layer Signaling," 3GPP TSG-RAN WG1 #66, R1-112300, Aug. 2011.
International Search Report issued for International Application No. PCT/JP2012/005126 on Oct. 30, 2012.
U.S. Appl. No. 13/248,777, filed Sep. 29, 2011, Zhanping Yin et al.
U.S. Appl. No. 13/360,572, filed Jan. 27, 2012, Zhanping Yin et al.
Email Discussion Rapporteur (CATT), "Summary of Email Discussion on Simulation Assumptions for Study on Further Enhancements to LTE TDD for DL-UL Interference Management and Traffic Adaptation," 3GPP TSG RAP WG1 Meeting #66, R1-112884, Aug. 2011.

(Continued)

*Primary Examiner* — Dang Ton
*Assistant Examiner* — Ronald H Davis
(74) *Attorney, Agent, or Firm* — Austin Rapp & Hardman

(57) ABSTRACT

An evolved Node B (eNB) configured for converting a downlink subframe is disclosed. The eNB includes a processor and executable instructions stored in memory that is in electronic communication with the processor. The eNB determines whether to convert a target downlink subframe to a special subframe type 2. The eNB also transmits physical (PHY) layer signaling indicating a subframe conversion for the target downlink subframe if it is determined to convert the target downlink subframe to the special subframe type 2.

14 Claims, 12 Drawing Sheets

(56) References Cited

OTHER PUBLICATIONS

RAN Chairman, RAN4 Chairman, "Work Plan for Rel-11 SI FS_LTE_TDD_eIMTA,"3GPP TSG RAN Meeting #54, RP-111755, Dec. 2011.
CMCC, "Further Discussion on UL/DL Asymmetry for TDD System," 3GPP TSG-RAN WG1 #66, R1-112590, Aug. 2011.
Sharp, "Fast Uplink-Downlink Re-Configuration with Traffic Adaptation by PHY Layer Signaling," 3GPP TSG-RAN WG1 #66, R1-112487, Aug. 2011.
Samsung, "Preliminary Evaluation of TDD UL-DL Reconfiguration Performance," 3GPP TSG RAN WG1 #66, R1-112525, Aug. 2011.
CATT, Ericsson, ST-Ericsson, "New Study Item Proposal for Further Enhancements to LTE TDD for DL-UL Interference Management and Traffic Adaptation," 3GPP TSG-RAN Meeting #51, RP-110450, Mar. 2010.
CMCC, "Application Scenario of Dynamic UL/DL Asymmetry for TDD," 3GPP TSG-RAN WG1 #65, R1-111778, May 2011.
ZTE, "Support to Live-Change of Downlink-Uplink Allocation Ratio in LTE/TDD," 3GPP TSG RAN WG1 Meeting #52bis, R1-081415, Apr. 2008.
3GPP TS 36.211 V10.2.0, "Evolved Universal Terrestrial Radio Access (E-UTRA); Physical Channels and Modulation (Release 10)," Jun. 2011.
3GPP TS 36.213 V10.2.0, "Evolved Universal Terrestrial Radio Access (E-UTRA); Physical Layer Procedures (Release 10)," Jun. 2011.
3GPP TS 36.331 V10.2.0, "Evolved Universal Terrestrial Radio Access (E-UTRA); Radio Resource Control (RRC); Protocol Specification (Release 10)," Jun. 2011.
3GPP TS 36.212 V10.2.0, "Evolved Universal Terrestrial Radio Access (E-UTRA); Multiplexing and Channel Coding (Release 10)," Jun. 2011.

* cited by examiner

US 9,036,491 B2

DEVICES FOR CONVERTING A DOWNLINK SUBFRAME

TECHNICAL FIELD

The present disclosure relates generally to communication systems. More specifically, the present disclosure relates to devices for converting a downlink subframe.

BACKGROUND

Wireless communication devices have become smaller and more powerful in order to meet consumer needs and to improve portability and convenience. Consumers have become dependent upon wireless communication devices and have come to expect reliable service, expanded areas of coverage, and increased functionality. A wireless communication system may provide communication for a number of wireless communication devices, each of which may be serviced by a base station. A base station may be a fixed station that communicates with wireless communication devices.

As wireless communication devices have advanced, improvements in communication capacity, speed and/or efficiency have been sought. However, improving communication capacity, speed and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
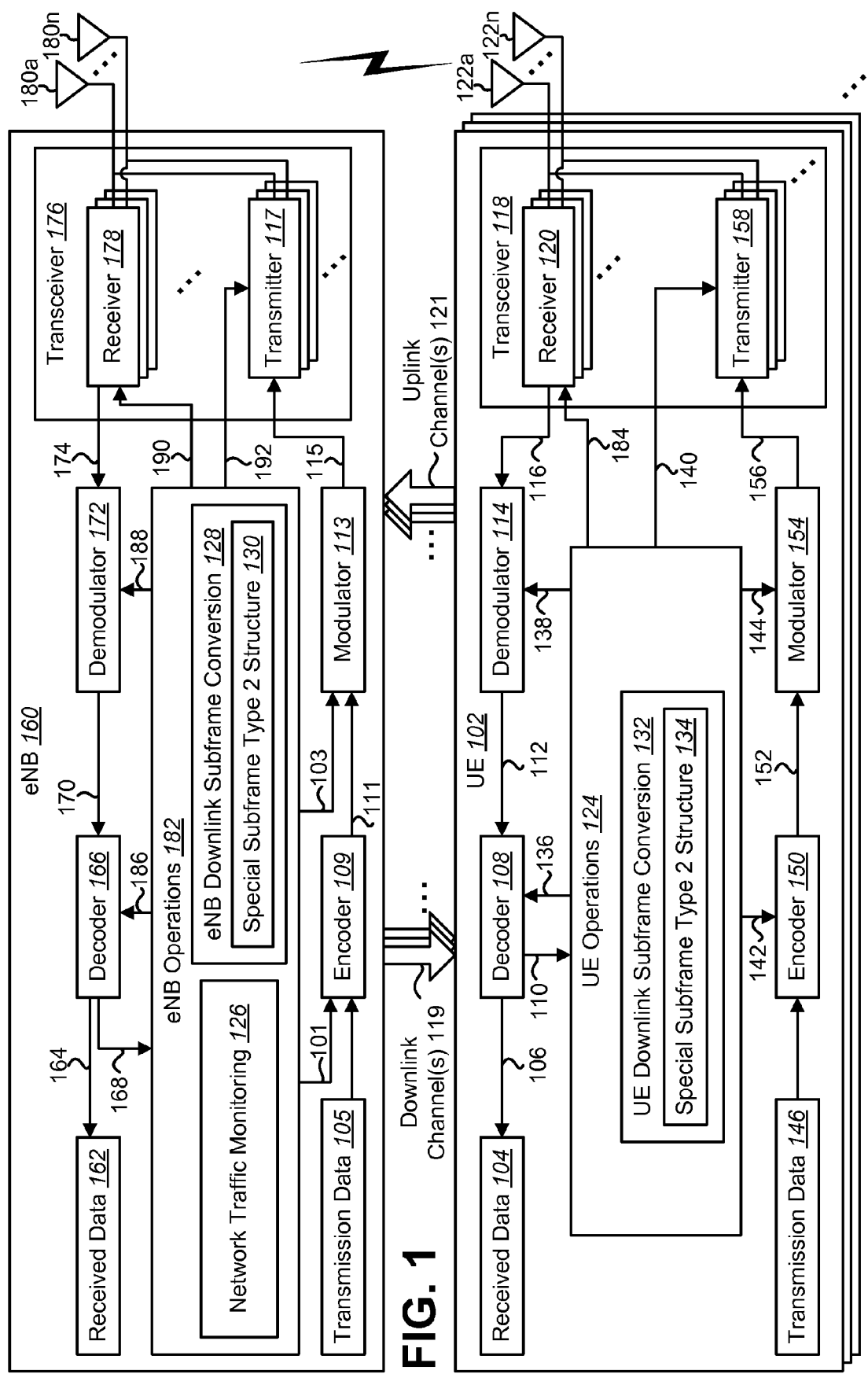
FIG. 1 is a block diagram illustrating one configuration of an evolved Node B (eNB) and one or more user equipments (UEs) in which systems and methods for converting a downlink subframe may be implemented.

An evolved Node B (eNB) configured for converting a downlink subframe is disclosed. The eNB includes a processor and executable instructions stored in memory that is in electronic communication with the processor. The eNB determines whether to convert a target downlink subframe to a special subframe type 2. The eNB also transmits physical (PHY) layer signaling indicating a subframe conversion for the target downlink subframe if it is determined to convert the target downlink subframe to the special subframe type 2. Determining whether to convert the target downlink subframe to the special subframe type 2 may be based on a traffic load.

If it is determined to convert the target downlink subframe to the special subframe type 2, the eNB may also determine whether an uplink-downlink association exists for the target downlink subframe. The eNB may also convert the target downlink subframe to the special subframe type 2 with a physical downlink control channel (PDCCH) if the uplink-downlink association exists for the target downlink subframe.

If an uplink-downlink association does not exist for the target downlink subframe, the eNB may determine whether the target downlink subframe immediately follows an uplink subframe. The eNB may convert the target downlink subframe to the special subframe type 2 without a guard period (GP) and without a physical downlink control channel (PDCCH) if the target downlink subframe immediately follows the uplink subframe. The eNB may further convert the target downlink subframe to the special subframe type 2 with a GP and without a PDCCH if the target downlink subframe does not immediately follow an uplink subframe.

The PHY layer signaling may be transmitted in a subframe that is four subframes before the target downlink subframe. The eNB may also transmit Acknowledgement and Negative Acknowledgement (ACK/NACK) data in a subframe that is six subframes after the target downlink subframe.

A User Equipment (UE) configured for receiving a signal is also disclosed. The UE includes a processor and executable instructions stored in memory that is in electronic communication with the processor. The UE receives physical (PHY) layer signaling indicating a subframe conversion for a target downlink subframe. The UE also converts the target downlink subframe to a special subframe type 2.

The UE may also determine whether an uplink-downlink association exists for the target downlink subframe. The UE may further convert the target downlink subframe to the special subframe type 2 with a physical downlink control channel (PDCCH) if the uplink-downlink association exists for the target downlink subframe.

If an uplink-downlink association does not exist for the target downlink subframe, the UE may determine whether the target downlink subframe immediately follows an uplink subframe. The UE may convert the target downlink subframe to the special subframe type 2 without a guard period (GP) and without a PDCCH if the target downlink subframe immediately follows the uplink subframe. The UE may also convert the target downlink subframe to the special subframe type 2 with a GP and without a PDCCH if the target downlink subframe does not immediately follow an uplink subframe.

If the uplink-downlink association exists for the target downlink subframe, the UE may determine whether a number of resource blocks (RBs) is less than or equal to ten. The UE may also reserve one orthogonal frequency division multiplexing (OFDM) symbol for the PDCCH if the number of RBs is not less than or equal to ten. The UE may further reserve two OFDM symbols for the PDCCH if the number of RBs is less than or equal to ten.

If the uplink-downlink association exists for the target downlink subframe, the UE may also perform data coding and multiplexing assuming a minimum PDCCH size and determine whether a physical control format indicator channel (PCFICH) indicates a size that is equal to the minimum PDCCH size. The UE may puncture data from the special subframe type 2 if the PCFICH indicates a size that is not equal to the minimum PDCCH size. The UE may also transmit coded and multiplexed data without a change if the PCFICH indicates a size that is equal to the minimum PDCCH size.

The PHY layer signaling may be received in a subframe that is four subframes before the target downlink subframe. The UE may also receive Acknowledgement and Negative Acknowledgement (ACK/NACK) data in a subframe that is six subframes after the target downlink subframe.

A method for converting a downlink subframe is also disclosed. The method includes determining whether to convert a target downlink subframe to a special subframe type 2. The method also includes transmitting physical (PHY) layer signaling indicating a subframe conversion for the target downlink subframe if it is determined to convert the target downlink subframe to the special subframe type 2.

A method for receiving a signal is also disclosed. The method includes receiving physical (PHY) layer signaling indicating a subframe conversion for a target downlink subframe. The method also includes converting the target downlink subframe to a special subframe type 2.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems, and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP Long Term Evolution (LTE), LTE-Advanced (LTE-A) and other standards (e.g., 3GPP Releases 8, 9, 10 and/or 11). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a User Equipment (UE), an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a User Equipment (UE). However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a Node B, an evolved or enhanced Node B (eNB), a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands to be used for communication between a Node B (e.g., eNodeB) and a UE. "Configured cells" are those cells of which the UE is aware and is allowed by a Node B (e.g., eNB) to transmit or receive information. "Configured cell(s)" may be serving cell(s). The UE may receive system information and perform the required measurements on all configured cells. "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The systems and methods disclosed herein may be used to dynamically change an uplink and downlink allocation. In LTE frequency-division duplexing (FDD), uplink and downlink signals may use different frequency bands. In this case, asymmetric traffic loads in a network may be managed by carrier aggregation (CA). For example, more frequency bands may be assigned to the direction (e.g., uplink or downlink) with a higher traffic load.

In LTE time-division duplexing (TDD), the same frequency band is used for both uplink and downlink signals. To achieve different downlink and uplink traffic ratios, seven uplink and downlink (UL-DL) configurations are specified in 3GPP specifications (e.g., 3GPP TS 36.211). These allocations can allocate between 40% and 90% of subframes to downlink signals.

According to current specifications (e.g., LTE Releases 8, 9 and 10), a system information change procedure is used to change the UL-DL configuration. This procedure has long delay, and requires a cold system restart (e.g., all UEs in a system cannot transmit and receive for a certain period of time in order to disconnect the uplink-downlink associations of the old configuration and set up new associations). It should be noted that a subframe association may be referred to as an "uplink-downlink association", which may include uplink to downlink subframe associations and/or downlink to uplink subframe associations. Examples of associations include association of a downlink subframe physical downlink control channel (PDCCH) to uplink power control in an uplink subframe, association of a downlink subframe physical downlink control channel (PDCCH) to physical uplink shared channel (PUSCH) allocation in an uplink subframe, associations of acknowledgement and negative acknowledgement (ACK/NACK) feedback on uplink subframe(s) for physical downlink shared channel (PDSCH) transmissions in downlink subframe(s), association of acknowledgement and negative acknowledgement (ACK/NACK) feedback on a physical hybrid automatic repeat request (HARQ) indicator channel (PHICH) or physical downlink control channel (PDCCH) for physical uplink shared channel (PUSCH) transmission(s) in uplink subframe(s), etc.

Using a system information change procedure to change the UL-DL configuration may be very costly to the system. Furthermore, changing the UL-DL configuration becomes more complicated with a ripple effect when adjacent cells also need to change the configuration. Additionally, interference issues may be caused by different UL-DL configurations in adjacent cells. Also, a current semi-static allocation may or may not match instantaneous traffic situations.

In the current specifications, a standard special subframe may be used for downlink to uplink switching with a reduced or minimum time allocated for uplink signals (e.g., one or two symbols). Most of the channel resources may be allocated for downlink transmission. This special subframe is designed to avoid overlapping downlink and uplink transmissions by using a gap or guard period (GP) at the transition from downlink to uplink, since uplink subframe timing is earlier than downlink subframe timing.

In a 3GPP meeting, a new study item was approved to study further enhancement to LTE TDD for downlink and uplink interference management and traffic adaptation. One objective of this study item would evaluate the benefits of uplink-downlink reconfiguration dependent upon traffic conditions for both isolated cell and multi-cell scenarios. The systems and methods disclosed herein address uplink-downlink reconfiguration.

In current LTE TDD systems, the uplink and downlink allocation is chosen from seven defined configurations, and is synchronized system wide. Currently, uplink-downlink allocation reconfiguration in a cell may be very costly because all transmissions have to be stopped to adjust the uplink-downlink associations. A change in one cell may cause or accompany a sequence of changes at neighbor cells (and their neighbor cells, etc.) to match uplink-downlink configuration synchronization at neighbor cells (and their neighbor cells, etc.). Furthermore, current uplink-downlink allocation reconfiguration requires a system information change, thus it has long delay and is not adaptive to instantaneous or short term changes in traffic load.

To support dynamic uplink and downlink allocation while reducing uplink-downlink allocation reconfiguration (using a system information change, for example), the systems and methods disclosed herein describe using physical layer (e.g., PHY layer) signaling to change the uplink and downlink allocation with traffic adaptation. The impacts of uplink to downlink and downlink to uplink conversion are discussed herein. A dynamic downlink to uplink conversion may be achieved by extending existing physical layer uplink-downlink associations.

The systems and methods disclosed herein define a new special subframe. This new special subframe may be referred to herein as a "special subframe type 2." The special subframe type 2 may support physical uplink shared channel (PUSCH) transmissions in a currently configured downlink subframe. A special subframe type 2 may allocate most channel resources for PUSCH transmission, while maintaining the physical downlink control channel (PDCCH) as needed. The systems and methods disclosed herein provide detailed structure and configuration procedures for the special subframe type 2. Furthermore, the procedures and signaling for changing (e.g., converting or reconfiguring) a downlink subframe to a special subframe type 2 are presented. In one configuration, the systems and methods disclosed herein maintain all existing uplink-downlink associations and are transparent to legacy UEs (e.g., UEs that function according to earlier specifications). Thus, no uplink-downlink allocation reconfiguration (with a system information change) procedure may be needed in some cases.

Some unique aspects of systems and methods disclosed herein may include using physical layer signaling to dynamically change uplink and downlink allocation without changing existing uplink downlink associations, defining a new special subframe type 2 for transitional and temporary subframe conversion. Furthermore, they may include defining the structure, configurations and the procedures to determine the configuration of a special subframe type 2. Additionally, they may include defining procedures for control signaling associations for the special subframe type 2 and procedures to dynamically convert or reconfigure a downlink subframe to a special subframe type 2 in order to accommodate more uplink traffic.

For clarity, one example of a frame structure that may be used in accordance with the systems and methods disclosed herein is given from 3GPP TS 36.211 as follows. This frame structure may be applicable in time-division duplexing (TDD) approaches. Each frame may have a length of $T_f=307200 \cdot T_s=10$ milliseconds (ms), where $T_f$ is a radio frame duration and $T_s$ is a time unit equal to $$\frac{1}{(15000 \times 2048)}$$

seconds. The frame may include two half-frames, each having a length of $153600 \cdot T_s=5$ ms. Each half-frame may include five subframes, each having a length of $30720 \cdot T_s=1$ ms. Some UL-DL frame configurations are illustrated in Table (1) below.

TABLE (1)

| UL-DL Configuration Number | Downlink-to-Uplink Switch-Point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table (1), for each subframe in a radio frame, "D" indicates that the subframe is reserved for downlink transmissions, "U" indicates that the subframe is reserved for uplink transmissions and "S" indicates a special subframe with three fields: a downlink pilot time slot (DwPTS), a guard period (GP) and an uplink pilot time slot (UpPTS). The length of DwPTS and UpPTS is given by Table 4.2-1 of 3GPP TS 36.211 subject to the total length of DwPTS, GP and UpPTS being equal to 30720·$T_s$=1 ms. Each subframe i is defined as two slots, 2i and 2i+1 of length $T_{slot}$=15360·$T_s$=0.5 ms in each subframe.

UL-DL configurations with both 5 ms and 10 ms downlink-to-uplink switch-point periodicity are supported. In the case of 5 ms downlink-to-uplink switch-point periodicity, the special subframe exists in both half-frames. In the case of 10 ms downlink-to-uplink switch-point periodicity, the special subframe exists in the first half-frame only. Subframes 0 and 5 and DwPTS may be reserved for downlink transmission. UpPTS and the subframe immediately following the special subframe may be reserved for uplink transmission. In case multiple cells are aggregated, a UE may assume the same UL-DL configuration across all the cells and that the guard period of the special subframe in the different cells have an overlap of at least 1456·$T_s$.

The UL-DL configuration may be a part of a SystemInformationBlockType1 (SIB1), defined by an information element (IE) TDD-Config, which includes a subframe assignment and specialSubframePatterns. The SIB1 may be transmitted on a broadcast control channel as a logical channel. To change the UL-DL configuration, a system information change procedure may be performed.

Some TDD configuration and reconfiguration issues are described as follows. A TDD configuration does not require paired frequency bands. Thus, one advantage of a TDD configuration is the flexibility of bandwidth allocation. In a TDD configuration, a frame may have 10 subframes. UL-DL configurations with both 5 ms and 10 ms downlink-to-uplink switch-point periodicity may be supported. Seven UL-DL configurations are specified in 3GPP standards. To avoid interference between uplink and downlink transmissions, system wide synchronization may be necessary. Therefore, all evolved Node Bs (eNBs) and all UEs may follow the same UL-DL configuration and timing.

In current specifications (e.g., LTE Releases 8, 9 and 10), a system information change procedure may be used to change the UL-DL configuration. This process requires multiple broadcast channel intervals and thus has a long delay and cannot adapt to an instantaneous traffic load change. The reconfiguration of uplink and downlink allocation may also be very costly. Due to different uplink-downlink associations, all transmitters may have to turn off the transmissions altogether to disconnect the uplink-downlink associations of the old configuration and to set up the new associations. Examples of associations include uplink power control, PUSCH association, ACK/NACK feedback, PHICH association, etc. This may cause a huge loss of system capacity and user traffic interruption. Furthermore, a change in one cell may force adjacent cells to change their UL-DL configurations. Thus, a "ripple" effect may occur.

The uplink-downlink association in an FDD configuration may be simple. In an FDD configuration with normal HARQ operation, for example, PUSCH power control and PUSCH transmission at a subframe n may be scheduled by a PDCCH with a downlink control information (DCI) format 0 at a subframe n−4 or by a PHICH in a subframe n−4 intended for a UE. ACK/NACK feedback of a PUSCH transmission at subframe n may be indicated on a PHICH or PDCCH at a subframe n+4. The ACK/NACK feedback of a physical downlink shared channel (PDSCH) transmission at a subframe k may be reported at a subframe k+4 on a physical uplink control channel (PUCCH) or a physical uplink shared channel (PUSCH) by the UE.

In one LTE TDD configuration, subframes may be allocated to the uplink and the downlink in the time domain. A fixed four subframe association may not be guaranteed because of the UL-DL configuration. For example, in an UL-DL configuration 0 for subframes 2 and 3, a PDCCH schedules the PUSCH transmission in uplink subframes that are 6 and 7 subframes later, respectively. Thus, the uplink-downlink associations may become very complicated, and different association configurations may be applied to different UL-DL configurations.

Examples of associations include association of a downlink subframe physical downlink control channel (PDCCH) to uplink power control in an uplink subframe, association of a downlink subframe physical downlink control channel (PDCCH) to physical uplink shared channel (PUSCH) allocation in an uplink subframe, associations of acknowledgement and negative acknowledgement (ACK/NACK) feedback on uplink subframe(s) for physical downlink shared channel (PDSCH) transmissions in downlink subframe(s), association of acknowledgement and negative acknowledgement (ACK/NACK) feedback on a physical hybrid automatic repeat request (HARQ) indicator channel (PHICH) or physical downlink control channel (PDCCH) for physical uplink shared channel (PUSCH) transmission(s) in uplink subframe(s), etc. For instance, an association may specify how a downlink subframe corresponds to an uplink subframe and/or how an uplink subframe corresponds to a downlink subframe. One example of an association specifies that a downlink subframe may schedule communications for an uplink subframe that follows the downlink subframe by a certain number of subframes. Another example of an association specifies that a downlink subframe that follows an uplink subframe by a certain number of subframes may contain ACK/NACK feedback corresponding to the uplink subframe.

In some configurations, the systems and methods disclosed herein may use TDD uplink-downlink associations according to current and/or past 3GPP specifications. Some examples of uplink-downlink associations that may be used in accordance to the systems and methods herein can be found in Sections 5.1.1.1, 7.3, 8, 8.2, 8.3, 9.1.2 and 10 of 3GPP TS 36.213 and in Section 6.9 of 3GPP TS 36.211.

In a traditional uplink-downlink allocation reconfiguration using a system information change procedure, old associations have to be broken first before new associations can take place. As a result, all transmissions have to be terminated during the transition period. This causes a huge waste of channel resource and service degradation and disruption. With high traffic load fluctuation, using frequent uplink-downlink allocation reconfiguration using the system information change procedure could cause serious network problems.

In one example, uplink-downlink associations for TDD configurations can be very different even when only a single subframe is different. For instance, it would seem to be a small difference between UL-DL configuration 1 and configuration 2 with only one subframe conversion between uplink and downlink in a 5 millisecond (ms) interval. However, none of the uplink-downlink associations are the same in these two configurations.

One example of a configuration of the systems and methods disclosed herein is given hereafter. With a 10 subframe period, assume that a TDD UL-DL configuration has $N_U$ uplink subframes, and (10−$N_U$) downlink subframes including special subframes. Assume that the network resource or capacity is normalized as 1 and that the aggregated uplink and aggregated download traffic loads are $\lambda_U$ and $\lambda_D$ respectively, where $\lambda_U$ and $\lambda_D$ are normalized uplink and downlink traffic loads (including required control signaling) as a percentage of channel usage.

Operators may configure the network with some desired load ratio "target" based on an operator's preference for its revenue model. The actual system traffic characteristic may contain two aspects. The first aspect is the total traffic load to capacity ratio, which is illustrated in the equation $\lambda=(\lambda_U+\lambda_D)$. The second aspect is the uplink to downlink traffic ratio, which is illustrated in the equation $$\frac{\lambda_U}{\lambda_D}.$$

The uplink to downlink traffic ratio may or may not match an operator's target or desired load ratio.

When the network aggregated traffic load to capacity ratio is low, an UL-DL configuration is acceptable if the uplink traffic and downlink traffic load can be supported by the allocated uplink subframes and downlink subframes as respectively illustrated in the equations $$\lambda_U \leq \frac{N_U}{10}$$

and $$\lambda_D \leq \left(1-\frac{N_U}{10}\right).$$

If the total traffic load to capacity ratio $\lambda \geq 1$, the system is overloaded or saturated. A scheduler at the eNB may be responsible to decide the priorities and the packets to be transmitted from the overloaded traffic load. When the network aggregated traffic load to capacity ratio is high or the system is overloaded, an UL-DL configuration with the right allocation of uplink to downlink traffic ratio may be preferred.

The LTE TDD uplink-downlink configuration is designed for aggregated network traffic flow. The traffic characteristics of each application and/or each UE may be significantly different. Statistically, the network traffic load (e.g., the aggregated traffic load of all UEs in a cell) should be relatively stable and change more gradually compared with the traffic characteristics of an individual UE. However, the aggregated traffic load may also fluctuate a lot around an average value. The average traffic load at a different time of the day can vary significantly. The uplink and downlink ratio may change significantly when some UEs use high bandwidth applications like video streaming and large file downloads.

A reconfiguration may be needed if either of the conditions $$\lambda_U \leq \frac{N_U}{10}$$

and $$\lambda_D \leq \left(1-\frac{N_U}{10}\right)$$

cannot be satisfied. A reconfiguration may also be needed if a current UL-DL configuration does not match the uplink to downlink traffic ratio, especially when the network aggregated traffic load to capacity ratio is high or the system is overloaded. Currently, a change of system information procedure may be used. This process is a radio resource control (RRC) layer procedure. It may take a long time and cannot be adjusted to instantaneous traffic load change. The instantaneous traffic load change may be temporary. By the time the network configuration is changed the traffic load may have already changed back to the normal state. Thus, another reconfiguration may be needed. Even worse, a change of UL-DL configuration in one cell may trigger the change of UL-DL configurations in adjacent cells, since the TDD system is designed to have the same UL-DL configuration to avoid interference between downlink and uplink transmissions. Therefore, changing an UL-DL configuration (using a change of system information) may be very costly at the RRC level, and may be beneficially avoided in some cases.

Some physical (PHY) layer uplink-downlink reconfiguration considerations are detailed hereafter. Considering real-time traffic load fluctuations, a more flexible time domain uplink-downlink reconfiguration may follow the characteristics of the traffic fluctuations. Thus, a PHY layer reconfiguration may be supported besides the system information change procedure. The PHY layer procedure may deal with most temporary traffic load fluctuations. The system information change procedure may be used only when the traffic change is very significant and the PHY layer procedure cannot handle the change.

The eNB may have full control of channel resources and UE behavior. Several downlink control information (DCI) formats are specified to carry different control information. For example, DCI format 0 is used for the scheduling of a physical uplink shared channel (PUSCH). DCI format 1 is used for the scheduling of physical downlink shared channel (PDSCH) codeword. Furthermore, DCI format 3 is used for the transmission of transmit power control (TPC) commands for a physical uplink control channel (PUCCH) and physical uplink shared channel (PUSCH) with a two-bit power adjustment.

In a downlink subframe, a UE should monitor the physical downlink control channel (PDCCH) and try to decode the PDCCH. In accordance with the systems and methods disclosed herein, it is possible to dynamically modify existing uplink and downlink allocations with a PHY layer procedure by a PDCCH located in a downlink subframe n to allocate PUSCH transmissions in a downlink subframe n+k, which is dynamically switched (e.g., converted or reconfigured) to a new uplink subframe. Furthermore, it is possible to use a PDCCH located in the subframe n+k to reduce or eliminate a physical downlink shared channel (PDSCH) allocation in the same subframe n+k. The PDCCH located in a downlink subframe n is not associated with a PUSCH transmission in the subframe n+k according to current specifications. Therefore, the PDCCH detection in the subframe n may be used to implicitly command a UE to switch (e.g., convert or reconfigure) the downlink subframe n+k to an uplink subframe (e.g., special subframe type 2).

The PDCCH and PHICH in a downlink subframe may be associated with PUSCH scheduling and ACK/NACK feedback of a PUSCH transmission. In this case, the downlink control symbols may not be turned off (e.g., the downlink subframe cannot be fully converted or reconfigured to an uplink subframe). For example, if the downlink subframe were to be fully converted to an uplink frame, the uplink subframe that depends on the PUSCH scheduling and the uplink subframe that requires PHICH feedback in the given downlink subframe would need to be emptied out. This contradicts the purpose of increasing the number of uplink subframes to fit the traffic load.

One the other hand, if there is no uplink association in a downlink subframe (e.g., when no PUSCH power control, no PUSCH scheduling and no PHICH feedback are allowed in the given downlink subframe), the given downlink subframe may be fully converted to an uplink subframe if it directly follows an uplink subframe. However, if the given subframe follows another downlink subframe, a guard period may be needed to adjust the time advance for uplink transmission.

The downlink to uplink subframe conversion may be controlled by PHY layer signaling. All legacy UEs (e.g., UEs that conform to 3GPP Releases 8, 9 and/or 10) may still designate the subframe as a downlink subframe and monitor it for a PDCCH. In case a PDCCH is not present, they may assume a discontinuous transmission (DTX) in the given subframe. Other UEs that support dynamic subframe conversion may use the given subframe as an uplink subframe following the PHY layer signaling.

When dynamic uplink and downlink (re)configuration (e.g., conversion) is applied, it is desirable to maintain all existing uplink-downlink associations (according to earlier 3GPP releases, for example). The systems and methods disclosed herein extend the special subframe of the current specifications for temporary and/or partial downlink to uplink conversion. The special subframe extension or new special subframe disclosed herein may be referred to as a "special subframe type 2" or "S2." Additionally or alternatively, the new special subframe or special subframe type 2 may be referred to as a hybrid subframe, flexible subframe, extensible special subframe, etc.

In an uplink subframe in LTE-TDD, only the UEs that have scheduled PUCCH and/or PUSCH transmissions may transmit on the channel. Other UEs may not sense the channel. Therefore, dynamically changing an uplink subframe to downlink subframe at the PHY layer is not feasible with existing PHY layer signaling for several reasons.

First, a PDCCH schedules a PDSCH transmission in the same subframe. However, UEs may not monitor the PDCCH to schedule the PDSCH in an uplink subframe that would be switched (e.g., converted) to a downlink subframe.

Second, an eNB may be able to avoid allocating a PUSCH transmission in an uplink subframe that would be switched (e.g., converted) to a downlink subframe. However, in order to prevent ACK/NACK feedback by a PUCCH or PUSCH transmission in the uplink subframe, the eNB may also avoid PDSCH allocations in subframes that are associated with ACK/NACK feedback. For example, no PDSCH transmissions may occur for all UEs in the subframes in the downlink association set. This contradicts the purpose of converting an uplink subframe to a downlink subframe. For instance, although more downlink subframes may be needed, more downlink subframes have to be emptied due to the ACK/NACK association issue.

More detail concerning the structure of a special subframe type 2 is given hereafter. The standard special subframe (not to be confused with the special subframe type 2) is used for downlink to uplink switching. In the standard special subframe, a short time may be allocated for uplink (e.g., one or two symbols), while most of the channel resource may be allocated for downlink transmission. The special subframe type 2 (S2) aims to provide more resources for uplink transmission while maintaining all necessary downlink signaling (e.g., control information for PUSCH scheduling and PHICH feedback). A downlink subframe may be converted to a special subframe type 2 by maintaining only the PDCCH transmission and allocating the rest of the resources to PUSCH transmission.

In PUSCH scheduling with PDCCH DCI format 0, a PUSCH allocation is a block of continuous resource blocks (RBs) represented by the index of the start RB and the number of RBs. The usable resource elements (REs) of each subcarrier in a PUSCH allocation for a special subframe type 2 may be the same as a number of symbols in an uplink pilot time slot (UpPTS) region. For example, the number of allocated REs may be a number of allocated RBs multiplied by 12 subcarriers in each RB multiplied by a number of usable symbols in each subcarrier. More detail regarding the structure of a special subframe type 2 is given below.

Similar to a standard special subframe, a special subframe type 2 has three fields. In a standard special subframe, the three fields are a downlink pilot time slot (DwPTS), a guard period (GP) and an uplink pilot time slot (UpPTS). For convenience, the three fields in the special subframe type 2 may also be referred to as a DwPTS, a GP and a UpPTS. Although the three fields in the special subframe type 2 may be referred to using the same names as in a standard special subframe, it should be noted that the characteristics of the three fields in the special subframe type 2 may be different from, similar to and/or the same as those of the same-named fields in the standard special subframe. For instance, more data may be carried in a UpPTS in a special subframe type 2 than in a standard special subframe.

The special subframe type 2 (S2) aims to provide increased resources for uplink transmission while maintaining necessary downlink signaling. For example, a special subframe type 2 maintains the PDCCH region as needed, but has no PDSCH allocation. Most of the resources in a special subframe type 2 are assigned for PUSCH transmissions. Since all uplink control feedback is associated with existing uplink subframes, no PUCCH allocation and PUCCH transmission may be allowed in a special subframe type 2.

In the special subframe type 2, a DwPTS may be limited to provide only necessary downlink control signaling (e.g., PDCCH and PHICH). The PDCCH may be used to schedule PUSCH transmission in an uplink subframe. However, since a PDCCH in a special subframe type 2 may not schedule a PDSCH transmission, the size of the DwPTS in a special subframe type 2 may be smaller than a DwPTS in a regular downlink subframe. For example, the number of orthogonal frequency-division multiplexing (OFDM) symbols used for a PDCCH should be limited to one or two when the number of resource blocks in a special subframe type 2 is greater than 10. Furthermore, the number of OFDM symbols used for a PDCCH should be two when the number of resource blocks in a special subframe type 2 is smaller than or equal to 10.

A guard period (GP) allows a UE to adjust a time advance for uplink transmission. If the uplink and downlink have the same cyclic prefix (CP) configuration, the GP in a special subframe type 2 may have a length of one OFDM symbol. If the uplink and downlink have different cyclic prefix (CP) configurations, the GP may be less than or more than one OFDM symbol. However, to ensure the switch timing, if present, the GP of a special subframe type 2 may have a length of at least $1456 \cdot T_s$.

If a downlink subframe does not have an association with PUSCH scheduling, power control and PHICH feedback to any uplink transmissions in the current UL-DL configuration, the downlink subframe may be converted to a special subframe type 2 with no reserved PDCCH region (e.g., a DwPTS length of 0). If the downlink subframe is immediately after an uplink subframe (or possibly after a special subframe type 2 in some configurations), the downlink subframe can be fully converted to an uplink subframe with no GP. If the downlink subframe to be converted is after a downlink subframe, the first OFDM symbol length may be reserved as a GP, while all other OFDM symbols may be allocated for uplink transmission, for example.

In one configuration of the special subframe type 2, the length of the DwPTS field and the length of the UpPTS field are given by Table (2) subject to the total length of DwPTS, GP and UpPTS being equal to $30720 \cdot T_s=1$ ms. More detail on the structure of a special subframe type 2 is given below.

TABLE (2)

| Number of OFDM symbols reserved for PDCCH | Normal CP in downlink | | | Extended CP in downlink | | |
|---|---|---|---|---|---|---|
| | | UpPTS | | | UpPTS | |
| | DwPTS | Normal CP in uplink | Extended CP in uplink | DwPTS | Normal CP in uplink | Extended CP in uplink |
| 0, no GP | 0 | $30720 \cdot T_s$ | $30720 \cdot T_s$ | 0 | $30720 \cdot T_s$ | $30720 \cdot T_s$ |
| 0, with GP | 0 | $28528 \cdot T_s$ | $28160 \cdot T_s$ | 0 | $28528 \cdot T_s$ | $28160 \cdot T_s$ |
| 1 | $2192 \cdot T_s$ | $26336 \cdot T_s$ | $25600 \cdot T_s$ | $2560 \cdot T_s$ | $26336 \cdot T_s$ | $25600 \cdot T_s$ |
| 2 | $4384 \cdot T_s$ | $24144 \cdot T_s$ | $23040 \cdot T_s$ | $5120 \cdot T_s$ | $24144 \cdot T_s$ | $23040 \cdot T_s$ |

Table (3) below provides the same configuration in terms of numbers of OFDM symbols. If one OFDM symbol is used for a PDCCH, the UpPTS may have 12 OFDM symbols if a normal cyclic prefix (CP) is configured for uplink transmission, or 10 OFDM symbols if an extended CP is configured for uplink transmission. If two OFDM symbols are used for a PDCCH, the UpPTS may have 11 OFDM symbols if a normal CP is configured for uplink transmission, or 9 OFDM symbols if an extended CP is configured for uplink transmission. For a special subframe type 2 with no reserved PDCCH region (e.g., a DwPTS length of 0), if the downlink subframe to be converted is directly after an uplink subframe, all symbols are used for uplink allocation. However, if the downlink subframe to be converted is after a downlink subframe, the first OFDM symbol length may be reserved as GP, while all other OFDM symbols may be allocated for uplink transmission.

TABLE (3)

| Number of OFDM symbols reserved for PDCCH | Normal CP in downlink | | | Extended CP in downlink | | |
|---|---|---|---|---|---|---|
| | | UpPTS | | | UpPTS | |
| | DwPTS | Normal CP in uplink | Extended CP in uplink | DwPTS | Normal CP in uplink | Extended CP in uplink |
| 0, no GP | 0 OFDM symbols | 14 OFDM symbols | 12 OFDM symbols | 0 OFDM symbols | 14 OFDM symbols | 12 OFDM symbols |
| 0, with GP | 0 OFDM symbols | 13 OFDM symbols | 11 OFDM symbols | 0 OFDM symbols | 13 OFDM symbols | 11 OFDM symbols |
| 1 | 1 OFDM symbol | 12 OFDM symbols | 10 OFDM symbols | 1 OFDM symbol | 12 OFDM symbols | 10 OFDM symbols |
| 2 | 2 OFDM symbols | 11 OFDM symbols | 9 OFDM symbols | 2 OFDM symbols | 11 OFDM symbols | 9 OFDM symbols |

Details regarding special subframe type 2 conversion rules and PHY layer signaling are given hereafter. A PUSCH transmission is scheduled by a PDCCH with an uplink DCI format and/or by a PHICH transmission in a subframe n intended for the UE. The corresponding PUSCH transmission may be adjusted in subframe n+k, where k=4 for FDD and where k for TDD is given in Table (4) below (from Table 8-2 in 3GPP TS 36.213), according to the PDCCH and PHICH information. It should be noted that "UL" denotes uplink and "DL" denotes downlink.

TABLE (4)

| TDD UL-DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | | 4 | 6 | | | | 4 | 6 | | |
| 1 | | 6 | | | 4 | | 6 | | | 4 |

TABLE (4)-continued

| TDD UL-DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 2 | | | | 4 | | | | | 4 | |
| 3 | 4 | | | | | | | 4 | 4 | |
| 4 | | | | | | | | 4 | 4 | |
| 5 | | | | | | | | 4 | | |
| 6 | 7 | 7 | | | | 7 | 7 | | | 5 |

According to current 3GPP specifications, no PUSCH transmission should be scheduled in a downlink subframe in TDD. The PUSCH assignment in an uplink subframe has a one-to-one association mapping to a downlink subframe. For example, for TDD UL/DL configurations 1-6 and normal HARQ operation, the UE may upon detection of a PDCCH with uplink DCI format 0 and/or a PHICH transmission in subframe n intended for the UE, adjust the corresponding PUSCH transmission in subframe n+k, with k given in Table (4), according to the PDCCH and PHICH information. According to current specifications, there may be some downlink subframes that cannot carry DCI format 0 for PUSCH allocation or cannot have PHICH feedback.

In accordance with the systems and methods disclosed herein, a downlink subframe may be converted to a special subframe type 2. This may occur, for example, when one or more DCI format 0 PUSCH transmissions are allocated in a downlink subframe (that is not allowed to have DCI format 0 for PUSCH assignment in current 3GPP Release 8, 9 and 10 specifications), or when PHICH feedback is required for a previously allocated special subframe type 2.

Associations for a special subframe type 2 may be specified as follows. A PDCCH with DCI format 0 in subframe n−4 may convert a downlink subframe n to a special subframe type 2. The ACK/NACK feedback for a special subframe type 2 with subframe number n may be reported in subframe n+6. In one configuration, the ACK/NACK for PUSCH transmission in a converted subframe n may be carried on a PHICH in subframe n+6. Additionally, the PDCCH in a subframe n+6 may override the PHICH and schedule a new data transmission or a retransmission in subframe n+10 by indicating whether this is new transmission or not.

In another configuration, there may be no PHICH feedback for PUSCH transmission in the converted subframe n and a UE may consider a PHICH value as an ACK. Furthermore, the PDCCH in subframe n+6 may override the ACK and schedule a new data transmission or a retransmission in subframe n+10 by indicating whether this is new transmission or not. Scheduling a retransmission in subframe n+10 may indicate a NACK for the PUSCH transmission in subframe n. If the UE does not detect any PDCCH, the UE may not transmit a PUSCH in subframe n+10. Since TDD may have a common interval of 10 for both 5 ms and 10 ms configurations, n+6= (n−4)+10, the PHICH and PDCCH allocation with DCI format 0 may always have the same downlink subframe index number.

In other words, the PUSCH of a special subframe type 2 with subframe number n may be scheduled in the PDCCH or a PHICH feedback of a downlink subframe that is four subframes before the special subframe type 2 (e.g., a downlink subframe with subframe number n−4). The ACK/NACK feedback of the PUSCH transmission in a special subframe type 2 with subframe number k may be reported on a PHICH or by explicit PDCCH scheduling in a downlink subframe with subframe number n+6. More detail on the associations of a special subframe type 2 is given below.

In one example, with current uplink and downlink (UL-DL) configuration (as illustrated in Table (1) above), there is only one uplink subframe at subframe number i=2. Furthermore, the PUSCH allocation is signaled by PDCCH DCI format 0 or a PHICH feedback in subframe number i=8 of the previous frame. All other downlink subframes cannot carry PDCCH DCI format 0 or PHICH feedback in this configuration according to current 3GPP specifications.

However, in accordance with the systems and methods disclosed herein, if a PDCCH DCI format 0 is assigned in subframe number i=9 to schedule a PUSCH transmission in a downlink subframe number i=3, the target downlink subframe with subframe number i=3 of the next frame may be converted to a special subframe type 2. A PUSCH transmission may be carried on the allocated PUSCH resource. The ACK/NACK of the PUSCH transmission may then be reported on the subframe number i=9.

The conversion to a special subframe type 2 from a downlink subframe may be temporary and dynamic. In some configurations, a downlink subframe may be converted to a special subframe type 2 only under the above conditions. Otherwise, the downlink subframe may function as a regular downlink subframe. Thus, the conversion and transition happen autonomously and no extra signaling is necessary.

Legacy UEs that do not expect a special subframe may treat it as a normal downlink subframe. When the PDCCH is present in a special subframe type 2, there is no change for legacy UEs. When the PDCCH is not present in a special subframe type 2, the legacy UEs may report a DTX for the subframe because they cannot detect a PDCCH successfully. Release-11 and beyond UEs may perform the required uplink-downlink association and data transmission in a special subframe type 2 in accordance with the systems and methods disclosed herein.

More detail regarding the determination of a special subframe type 2 structure and PUSCH resource allocation is given hereafter. With a special subframe type 2, the available resource elements (REs) in a PUSCH allocation may be decided by the number of OFDM symbols in the UpPTS region or field. Therefore, the special subframe type 2 configuration may be known to the eNB and one or more UEs before PUSCH scheduling on a special subframe type 2. UEs may need the configuration to perform data coding and multiplexing on the given PUSCH resource. Furthermore, the eNB may need the same information to receive and decode the PUSCH data.

One example of a procedure is given hereafter regarding determining the configuration if a downlink subframe is converted to a special subframe type 2. The downlink subframe to be converted to a special subframe type 2 (e.g., a "target downlink subframe") may be determined by PHY layer signaling and rules as given above. For the target downlink subframe, this procedure illustrates how to determine the special subframe type 2 structure for a downlink subframe conversion.

If the target downlink subframe does not have associations with PUSCH scheduling, power control and PHICH feedback to any uplink transmissions in the current UL-DL configuration, the target downlink subframe may be converted to a special subframe type 2 with no reserved PDCCH region (e.g., with a DwPTS length of 0). If the target downlink subframe is directly after an uplink subframe (or possibly a special subframe type 2 in some configurations), the target downlink subframe may be fully converted to an uplink subframe with no guard period (GP). However, if the target downlink subframe is after a downlink subframe, the first OFDM symbol length may be reserved as GP, while all other OFDM symbols may be allocated for uplink transmission.

If the target downlink subframe has associations with PUSCH scheduling, power control and PHICH feedback to any uplink transmissions in the standard UL-DL configuration, the target downlink subframe may be converted to a special subframe type 2 with a reserved PDCCH region or field. In this case, the length of the PDCCH region may be further determined.

In LTE networks, the physical control format indicator channel (PCFICH) carries information about the number of OFDM symbols used for transmission of PDCCHs in a subframe. The PCFICH may be transmitted when the number of OFDM symbols for a PDCCH is greater than zero.

Several alternative approaches may be used to decide the PDCCH length of a special subframe type 2 with a reserved PDCCH region or field. In a first alternative, the special subframe type 2 may use a fixed configuration for the length of PDCCH region or field. In one configuration, one OFDM symbol may be reserved for the PDCCH if the number of resource blocks (RBs) is greater than 10, and two OFDM symbols may be reserved if the number of RBs is smaller or equal to 10. In another configuration, two OFDM symbols may always be reserved for the PDCCH. The fixed configuration may be signaled by the eNB with explicit signaling (e.g., in RRC signaling such as in system information).

In one configuration with a fixed PDCCH length configuration, the PCFICH may not be needed in a special subframe type 2. In another configuration, the PCFICH may be included and comply with the given configuration for the number of OFDM symbols reserved for the PDCCH in a special subframe type 2. The number of OFDM symbols used for the PDCCH signaled in the PCFICH may be the less or equal to the number of OFDM symbols reserved for the PDCCH in a special subframe type 2. For example, if the number of OFDM symbols reserved for PDCCH in a special subframe type 2 is two, the PCFICH may configure the number of symbols used for PDCCH to one or two depending on the payload on the PDCCH. Once the special subframe type 2 configuration is set up, the eNB and one or more UEs may follow the configuration and do the PUSCH scheduling and PUSCH transmission accordingly.

In a second alternative, the PDCCH length may be determined by the PCFICH. However, since the PCFICH information (e.g., the length of the PDCCH region) may not be initially known to a UE in a special subframe type 2, the UE may have to process data with a default setting with a minimum PDCCH size. Therefore, the UE may perform data coding and multiplexing assuming a minimum PDCCH size in a special subframe type 2 (e.g., one OFDM symbol for a PDCCH if the number of RBs is greater than 10, and two OFDM symbols if the number of RBs is smaller than or equal to 10).

Upon detection of the PCFICH in a special subframe type 2, the UE with PUSCH scheduling in the special subframe type 2 may get the number of OFDM symbols for the PDCCH from the PCFICH. If the PCFICH indicates the same number of OFDM symbols as are in the default minimum PDCCH size, the coded and multiplexed data may be transmitted with no change. However, if the PDCCH region given by the PCFICH is larger than the default value, the uplink transmission may use a special subframe type 2 structure determined by the number of OFDM symbols from PCFICH. For example, the coded and multiplexed data in the OFDM symbol that is emptied out by the selected special subframe type 2 structure may be punctured out. Thus no PUSCH transmission may occur in the given OFDM symbol.

In one example, assume a normal CP with both uplink and downlink. A UE with a PUSCH allocation in a special subframe type 2 may assume a default setting of one OFDM symbol for the PDCCH followed by one OFDM symbol length of GP. Thus, the data coding and multiplexing is performed with 12 symbols per subcarrier in a subframe. The UE then detects the PCFICH in the special subframe type 2. If the PCFICH indicates one OFDM symbol for the PDCCH, the PUSCH may be transmitted with all coded and multiplexed data. If the PCFICH indicates 2 OFDM symbols for the PDCCH, however, the special subframe type 2 structure should have two OFDM symbols for DwPTS, one OFDM symbol for GP, and 10 OFDM symbols for a PUSCH transmission. The UE may then puncture out all coded and multiplexed data on the fourth OFDM symbol resulting in a PUSCH transmission in 10 OFDM symbols in a subcarrier of the special subframe type 2.

More detail on the use of the special subframe type 2 for PHY layer dynamic downlink to uplink conversion is given hereafter. As described above, a dynamic change in an uplink subframe to downlink subframe at the PHY layer is not feasible with existing PHY layer signaling. Thus, a system information change procedure may be used for this case. However, a downlink subframe to uplink subframe conversion may be performed dynamically with a PHY layer procedure using the special subframe type 2 as described above.

Some benefits of downlink to uplink conversion using a special subframe type 2 are given hereafter. In accordance with the systems and methods disclosed herein, the downlink to uplink conversion may extend current PHY layer uplink-downlink associations. For example, the PUSCH allocation of a special subframe type 2 with subframe number n may be scheduled by a PDCCH or a PHICH feedback in a downlink subframe with subframe number n–4. Furthermore, the PHICH feedback of the PUSCH transmission in a special subframe with subframe number n may be in a downlink subframe with subframe number n+6.

Furthermore, the systems and methods disclosed herein do not break any existing uplink-downlink associations (e.g., no PUCCH is necessary or allowed in a special subframe type 2). Also, the subframe conversion is dynamic, autonomous and flexible. Additionally, any downlink subframe may be converted to a special subframe if the association rule can be satisfied. Thus, one or more downlink subframes may be converted to special subframe type 2 subframes.

The proposed downlink to uplink conversion has a small cost to the system. Downlink subframes may be dynamically converted to special subframe type 2 subframes with PHY layer procedures as necessary or desired if the current uplink allocation cannot handle the uplink traffic. Thus, the proposed approach may handle most traffic fluctuations of increased uplink transmission without an UL-DL configuration change using the system information change procedure.

In one example, the network UL-DL configuration may be initialized and configured with more downlink subframes (e.g., the UL-DL configuration may be based on the peak downlink traffic load or based on the uplink to downlink traffic ratio with a bias to downlink transmission). Under normal circumstances, the downlink traffic may be higher than uplink in a network. The traffic load may become unbalanced if one or more UEs start data intensive applications, or in pico cell traffic offloading scenarios.

When performing PHY layer signaling for dynamic downlink to uplink conversion, some guidelines may be applied. First, subframe 0 and subframe 5 may be downlink subframes only as in the current UL-DL configurations, and may not be converted to the special subframe type 2. Furthermore, when a downlink subframe is converted to a special subframe type 2, a subframe that is directly after an uplink subframe or another special subframe type 2 may be considered first and/or prioritized (for conversion).

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one configuration of an evolved Node B (eNB) 160 and one or more user equipments (UEs) 102 in which systems and methods for converting a downlink subframe may be implemented. The one or more UEs 102 communicate with an evolved Node B (eNB) 160 using one or more antennas 122*a-n*. For example, a UE 102 transmits electromagnetic signals to the eNB 160 and receives electromagnetic signals from the eNB 160 using the one or more antennas 122*a-n*. The eNB 160 communicates with the UE 102 using one or more antennas 180*a-n*. It should be noted that the eNB 160 may be a Node B, home evolved Node B (HeNB) or other kind of base station in some configurations.

The UE 102 and the eNB 160 may use one or more channels 119, 121 to communicate with each other. For example, a UE 102 may transmit information or data to the eNB 160 using one or more uplink channels 121. Examples of uplink channels 121 include a physical uplink control channel (PUCCH) and a physical uplink shared channel (PUSCH), etc. The eNB 160 may also transmit information or data to the one or more UEs 102 using one or more downlink channels 119, for instance. Examples of downlink channels 119 include a physical downlink control channel (PDCCH), a physical downlink shared channel (PDSCH), etc. Other kinds of channels may be used.

Each of the one or more UEs 102 may include one or more transceivers 118, one or more demodulators 114, one or more decoders 108, one or more encoders 150, one or more modulators 154 and an UE operations module 124. For example, one or more reception and/or transmission paths may be used in the UE 102. For convenience, only a single transceiver 118, decoder 108, demodulator 114, encoder 150 and modulator 154 are illustrated, though multiple parallel elements (e.g., transceivers 118, decoders 108, demodulators 114, encoders 150 and modulators 154) may be used depending on the configuration.

The transceiver 118 may include one or more receivers 120 and one or more transmitters 158. The one or more receivers 120 may receive signals from the eNB 160 using one or more antennas 122*a*-*n*. For example, the receiver 120 may receive and downconvert signals to produce one or more received signals 116. The one or more received signals 116 may be provided to a demodulator 114. The one or more transmitters 158 may transmit signals to the eNB 160 using one or more antennas 122*a*-*n*. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce one or more decoded signals 106, 110. For example, a first UE-decoded signal 106 may comprise received payload data 104. A second UE-decoded signal 110 may comprise overhead data and/or control data. For example, the second UE-decoded signal 110 may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the UE operations module 124 may be implemented in hardware, software or a combination of both.

In general, the UE operations module 124 may enable the UE 102 to communicate with the eNB 160. The UE operations module 124 may include a UE downlink subframe conversion module 132. The UE downlink subframe conversion module 132 may include a special subframe type 2 structure 134.

The UE downlink subframe conversion module 132 may convert a downlink subframe into a special subframe type 2. It should be noted that one or more downlink subframes may be converted. For example, one or more of the subframes denoted as downlink subframes in Table (1) may be converted to special subframe type 2 subframes. For instance, the one or more UEs 102 and the eNB 160 may be operating according to a particular configuration where certain subframes in a radio frame are designated as downlink subframes as illustrated in FIG. 1. However, using the systems and methods disclosed herein, the UE 102 may convert a downlink subframe into a special subframe type 2.

As described above, the special subframe type 2 may allow the eNB 160 to dynamically and temporarily allocate more communication resources to uplink transmissions. This may allow the one or more UEs 102 to transmit more uplink data to the eNB 160 (when needed or beneficial, for example).

The UE downlink subframe conversion module 132 may use a special subframe type 2 structure 134 to convert a downlink subframe into a special subframe type 2. For example, the special subframe type 2 structure 134 may specify the structure of the special subframe type 2 in certain circumstances. For instance, the structure of the special subframe type 2 may vary depending on whether an association corresponds to a target downlink subframe (e.g., the downlink subframe to be converted), depending on whether an uplink or downlink subframe immediately precedes the target downlink subframe and/or depending on a length of a PDCCH that may (or may not) be included in the special subframe type 2.

The UE operations module 124 may provide information 184 to the one or more receivers 120. For example, the UE operations module 124 may inform the receiver(s) 120 when or when not to receive transmissions based on whether a downlink subframe is converted to a special subframe type 2.

The UE operations module 124 may provide information 138 to the demodulator 114. For example, the UE operations module 124 may inform the demodulator 114 of a modulation pattern anticipated for transmissions from the eNB 160. In some configurations, this may be based on whether a downlink subframe is converted to a special subframe type 2.

The UE operations module 124 may provide information 136 to the decoder 108. For example, the UE operations module 124 may inform the decoder 108 of an anticipated encoding for transmissions from the eNB 160. In some configurations, this may be based on whether a downlink subframe is converted to a special subframe type 2.

The UE operations module 124 may provide information 142 to the encoder 150. The information 142 may include data to be encoded and/or instructions for encoding. For example, the UE operations module 124 may instruct the encoder 150 to encode transmission data 146 and/or control information 142 based on whether a downlink subframe is converted to a special subframe type 2. For instance, the UE operations module 124 may inform the encoder 150 to assume a minimum PDCCH length for encoding and multiplexing in some configurations.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the eNB 160. In some configurations, this may be based on whether a downlink subframe is converted to a special subframe type 2. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the eNB 160. In some configurations, this may be based on whether a downlink subframe is converted to a special subframe type 2. For instance, the one or more transmitters 158 may transmit during a downlink subframe that has been converted to a special subframe type 2. The one or more transmitters 158 may upconvert and transmit the modulated signal(s) 156 to one or more eNBs 160.

The eNB 160 may include one or more transceivers 176, one or more demodulators 172, one or more decoders 166, one or more encoders 109, one or more modulators 113 and an eNB operations module 182. For example, one or more reception and/or transmission paths may be used in an eNB 160. For convenience, only a single transceiver 176, decoder 166, demodulator 172, encoder 109 and modulator 113 are illustrated, though multiple parallel elements (e.g., transceivers 176, decoders 166, demodulators 172, encoders 109 and modulators 113) may be used depending on the configuration.

The transceiver 176 may include one or more receivers 178 and one or more transmitters 117. The one or more receivers 178 may receive signals from the UE 102 using one or more antennas 180*a-n*. For example, the receiver 178 may receive and downconvert signals to produce one or more received signals 174. The one or more received signals 174 may be provided to a demodulator 172. The one or more transmitters 117 may transmit signals to the UE 102 using one or more antennas 180*a-n*. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 164, 168. For example, a first eNB-decoded signal 164 may comprise received payload data 162. A second eNB-decoded signal 168 may comprise overhead data and/or control data. For example, the second UE-decoded signal 168 may provide data that may be used by the eNB operations module 182 to perform one or more operations.

The eNB operations module 182 may include a network traffic monitoring module 126 and an eNB downlink subframe conversion module 128. The network traffic monitoring module 126 may monitor the amount of uplink and downlink traffic (e.g., communications) occurring between the eNB 160 and the one or more UEs 102. For example, the network traffic monitoring module 126 may determine whether current uplink and/or downlink allocations are sufficient for current traffic loads.

The eNB downlink subframe conversion module 128 may control whether one or more downlink subframes are converted to one or more special subframe type 2 subframes. For example, if the network traffic monitoring module 126 indicates that the current uplink traffic allocation is insufficient to handle the current uplink traffic load, the eNB downlink subframe conversion module 128 may generate physical (PHY) layer signaling that is used to inform the one or more UEs 102 to convert a downlink subframe to an uplink subframe.

The eNB downlink subframe conversion module 128 may include a special subframe type 2 structure 130. The special subframe type 2 structure 130 may specify the structure of the special subframe type 2 in certain circumstances. For instance, the structure of the special subframe type 2 may vary depending on whether an association corresponds to a target downlink subframe (e.g., the downlink subframe to be converted), depending on whether an uplink or downlink subframe precedes the target downlink subframe and/or depending on a length of a PDCCH that may (or may not) be included in the special subframe type 2.

The eNB operations module 182 may provide information 190 to the one or more receivers 178. For example, the eNB operations module 182 may inform the receiver(s) 178 when or when not to receive transmissions based on whether a downlink subframe is converted to a special subframe type 2.

The eNB operations module 182 may provide information 188 to the demodulator 172. For example, the eNB operations module 182 may inform the demodulator 172 of a modulation pattern anticipated for transmissions from the UE(s) 102. In some configurations, this may be based on whether a downlink subframe is converted to a special subframe type 2.

The eNB operations module 182 may provide information 186 to the decoder 166. For example, the eNB operations module 182 may inform the decoder 166 of an anticipated encoding for transmissions from the UE(s) 102. In some configurations, this may be based on whether a downlink subframe is converted to a special subframe type 2.

The eNB operations module 182 may provide information 101 to the encoder 109. The information 101 may include data to be encoded and/or instructions for encoding. For example, the eNB operations module 182 may instruct the encoder 109 to encode transmission data 105 and/or control information 101 based on whether a downlink subframe is converted to a special subframe type 2. Additionally or alternatively, the information 101 may include data to be encoded, such as PHY layer signaling (e.g., a PDCCH, a PHICH, etc.) indicating scheduling information, HARQ data, channel allocations and/or other control information.

The encoder 109 may encode transmission data 105 and/or other information 101 provided by the eNB operations module 182. For example, encoding the data 105 and/or other information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The eNB operations module 182 may provide information 103 to the modulator 113. This information 103 may include instructions for the modulator 113. For example, the eNB operations module 182 may inform the modulator 113 of a modulation type (e.g., constellation mapping) to be used for transmissions to the UE(s) 102. In some configurations, this may be based on whether a downlink subframe is converted to a special subframe type 2. The modulator 113 may modulate the encoded data 111 to provide one or more modulated signals 115 to the one or more transmitters 117.

The eNB operations module 182 may provide information 192 to the one or more transmitters 117. This information 192 may include instructions for the one or more transmitters 117. For example, the eNB operations module 182 may instruct the one or more transmitters 117 when to (or when not to) transmit a signal to the UE(s) 102. In some configurations, this may be based on whether a downlink subframe is converted to a special subframe type 2. For instance, the one or more transmitters 117 may not transmit during portions or all of a downlink subframe that has been converted to a special subframe type 2. The one or more transmitters 117 may upconvert and transmit the modulated signal(s) 115 to one or more UEs 102.

It should be noted that a downlink subframe may be transmitted from the eNB 160 to one or more UEs 102 and that an uplink subframe may be transmitted from one or more UEs 102 to the eNB 160. Furthermore, both the eNB 160 and the one or more UEs 102 may transmit data in a standard special subframe. In a special subframe type 2, one or more UEs 102 may transmit data. However, in a special subframe type 2, the eNB 160 may or may not transmit data.

Figure 2:
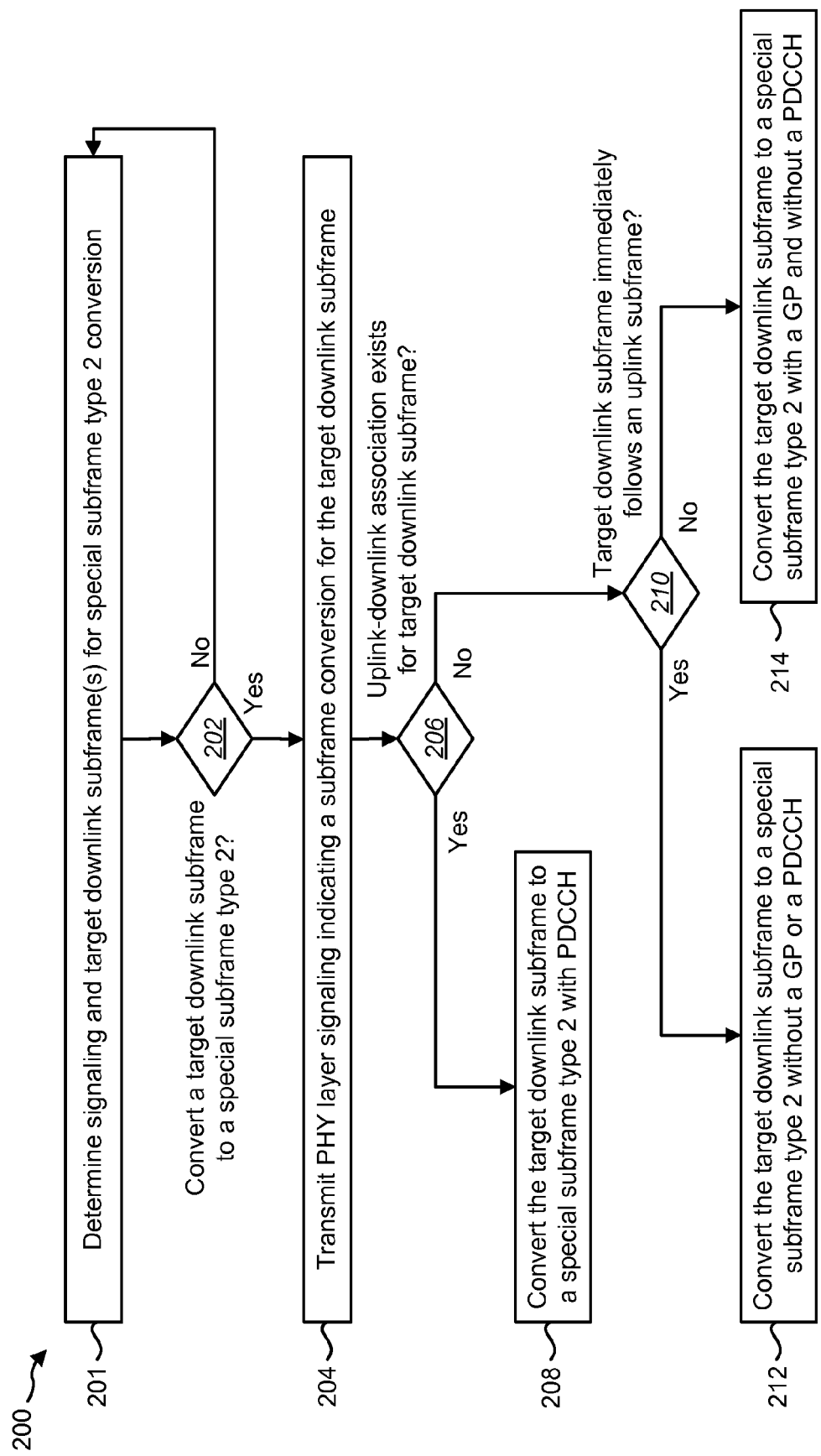
FIG. 2 is a flow diagram illustrating one configuration of a method for converting a downlink subframe on an eNB.

FIG. 2 is a flow diagram illustrating one configuration of a method 200 for converting a downlink subframe on an eNB 160. The eNB 160 may determine 201 signaling and one or more target downlink subframes for special subframe type 2 conversion. A signaling subframe may be a downlink subframe, a standard special subframe or a special subframe type 2. The signaling subframe and the target downlink subframe pairs should have an appropriate separation distance (e.g., four subframes). Furthermore, the signaling downlink subframe may not have associations on PUSCH scheduling and/or ACK/NACK feedback for PUSCH transmission on PHICH or PDCCH. The target downlink subframe may be decided by a pre-defined order based on the number of special subframe type 2 subframes in one configuration.

The eNB 160 may determine 202 whether to convert a target downlink subframe to a special subframe type 2. For example, the eNB 160 may determine 202 whether to convert a target downlink subframe to a special subframe type 2 based on current traffic allocations and current traffic loads.

In one configuration, assume a 10 subframe period and assume a TDD UL-DL configuration of $N_U$ uplink subframes and $(10-N_U)$ downlink subframes including special subframes. Assume that the network resource or capacity is normalized as 1 and that the aggregated uplink and aggregated download traffic loads are $\lambda_U$ and $\lambda_D$ respectively, where $\lambda_U$ and $\lambda_D$ are normalized uplink and downlink traffic loads (including required control signaling) as a percentage of channel usage.

Operators may configure the network (e.g., eNB 160) with some desired load ratio "target" based on an operator's preference for its revenue model. Actual traffic characteristics may contain two aspects. The first aspect is the total traffic load to capacity ratio, which is illustrated in the equation $\lambda=(\lambda_U+\lambda_D)$. The second aspect is the uplink to downlink traffic ratio, which is illustrated in the equation $$\frac{\lambda_U}{\lambda_D}.$$

The uplink to downlink traffic ratio may or may not match an operator's target or desired load ratio.

When the network aggregated traffic load to capacity ratio is low, an UL-DL configuration may be acceptable if the uplink traffic and downlink traffic load can be supported by the allocated uplink subframes and downlink subframes as respectively illustrated in the equations $$\lambda_U \leq \frac{N_U}{10}$$

and $$\lambda_D \leq \left(1 - \frac{N_U}{10}\right).$$

In some configurations, the eNB 160 may determine 202 to convert a target downlink subframe to a special subframe type 2 if the current uplink traffic load is greater than can be accommodated by the allocated uplink subframes (e.g., $$\lambda_U \leq \frac{N_U}{10}$$

is not satisfied) and/or if the current downlink traffic load is not filling the allocated downlink subframes.

Additionally or alternatively, the eNB 160 may determine 202 to convert a target downlink subframe to a special subframe type 2 if the current uplink to downlink traffic ratio $$\frac{\lambda_U}{\lambda_D}$$

is greater than a target uplink to downlink traffic ratio by a certain amount. Other approaches may be additionally or alternatively used to determine 202 whether to convert a target downlink subframe to a special subframe type 2.

If the eNB 160 determines 202 not to convert a target downlink subframe, the eNB 160 may not convert the target downlink subframe and return to determine 201 the signaling and target downlink subframes for special subframe type 2 conversion.

If the eNB 160 determines 202 to convert a target downlink subframe to a special subframe type 2, the eNB 160 may transmit 204 physical (PHY) layer signaling that indicates subframe conversion for the target downlink subframe. For example, the eNB 160 may generate and transmit 204 a PDCCH with DCI format 0 or may generate and transmit 204 a PHICH for a particular UE. Transmitting 204 the PDCCH with DCI format 0 may implicitly indicate that a target downlink subframe should be converted to a special subframe type 2.

The eNB 160 may determine 206 whether an uplink-downlink association exists for the target downlink subframe. For example, the eNB 160 may determine whether the target downlink subframe is associated with an anticipated uplink subframe (e.g., for power control, scheduling, etc.). For instance, the eNB 160 may determine 206 whether an uplink power control association, a PUSCH association, an ACK/NACK feedback association for PUSCH transmission, a PHICH association or some other association corresponds to the target downlink subframe.

If the eNB 160 determines 206 that an uplink-downlink association exists for the target downlink subframe, the eNB 160 may convert 208 the target downlink subframe to a special subframe type 2 with a PDCCH. For example, the eNB 160 may reserve a portion of the special subframe type 2 for a PDCCH. The eNB 160 may also transmit data in the special subframe type 2 in a DwPTS region.

If an uplink-downlink association does not exist for the target downlink subframe, the eNB 160 may determine 210 whether the target downlink subframe immediately follows an uplink subframe. In some configurations, this determination 210 may be based on standard uplink subframes. In all UL-DL configurations, a standard special subframe is followed by an uplink subframe. Therefore, a special subframe type 2 may only be behind an uplink subframe or a downlink subframe.

In some configurations, special subframe type 2 subframes may or may not be considered uplink subframes for this determination 210. For example, if a special subframe type 2 (S2) is right after another S2, the previous S2 may be treated as an uplink. In some cases, however, the eNB 160 may schedule a UE 102 in the second S2 only. In such a case, the previous S2 may be unknown to the UE 102. This may cause a problem. However, the problem can be solved if the S2 position is well defined so that the second S2 is only allowed when the previous subframe is also an S2.

If an uplink-downlink association does not exist for the target downlink subframe and the target downlink subframe immediately follows an uplink subframe, the eNB 160 may convert 212 the target downlink subframe to a special subframe type 2 without a guard period (GP) and without a PDCCH. In this case, the target downlink subframe may be fully converted to an uplink subframe. The eNB 160 may receive data in the special subframe type 2.

If an uplink-downlink association does not exist for the target downlink subframe and the target downlink subframe does not immediately follow an uplink subframe, the eNB 160 may convert 214 the target downlink subframe to a special subframe type 2 with a GP and without a PDCCH. For example, the eNB 160 may reserve a portion of the special subframe type 2 for a GP. The GP allows the UE 102 to adjust a time advance for uplink transmission. If the uplink and downlink have the same cyclic prefix (CP) configuration, the GP in the special subframe type 2 may have a length of one OFDM symbol. If the uplink and downlink have different cyclic prefix (CP) configurations, the GP may be less than or more than one OFDM symbol. However, to ensure the switch timing, the GP of a special subframe type 2 may have a length of at least $1456 \cdot T_s$.

Figure 3:
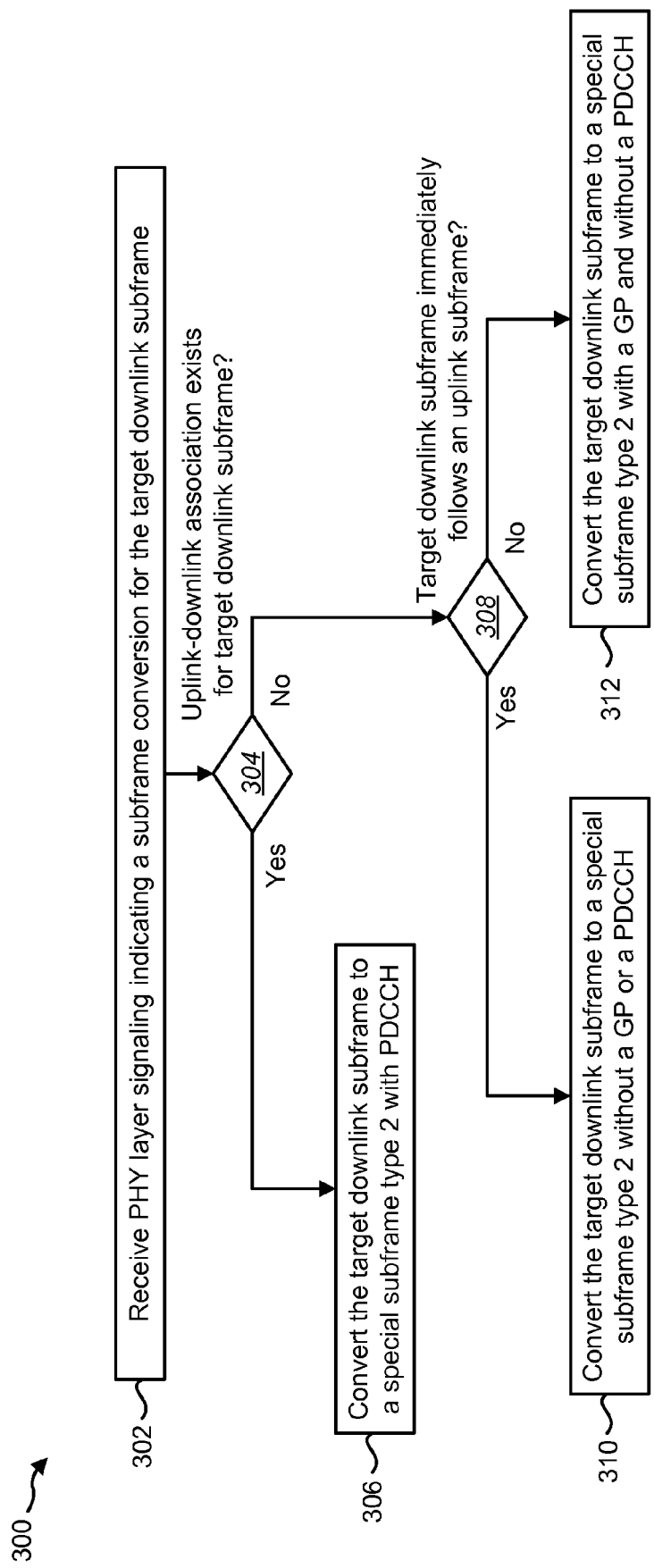
FIG. 3 is a flow diagram illustrating one configuration of a method for receiving a signal for converting a downlink subframe on a UE.

FIG. 3 is a flow diagram illustrating one configuration of a method 300 for receiving a signal for converting a downlink subframe on a UE 102. The UE 102 may receive 302 physical (PHY) layer signaling that indicates subframe conversion for the target downlink subframe. For example, the UE 102 may receive 302 a PDCCH with DCI format 0 or may receive 302 a PHICH. Receiving 302 the PDCCH with DCI format 0 may implicitly indicate that a target downlink subframe should be converted to a special subframe type 2.

The UE 102 may determine 304 whether an uplink-downlink association exists for the target downlink subframe. For example, the UE 102 may determine whether the target downlink subframe is associated with an anticipated uplink subframe (e.g., for power control, scheduling, etc.). For instance, the UE 102 may determine 304 whether an uplink power control association, a PUSCH association, an ACK/NACK feedback association for PUSCH transmission, a PHICH association or some other association corresponds to the target downlink subframe.

If the UE 102 determines 304 that an uplink-downlink association exists for the target downlink subframe, the UE 102 may convert 306 the target downlink subframe to a special subframe type 2 with a PDCCH. For example, the UE 102 may reserve a portion of the special subframe type 2 for a PDCCH. The UE may also transmit data and receive data in the special subframe type 2. In this case, the length of the PDCCH may need to be determined. Approaches for determining the length of the PDCCH are described in greater detail below.

If an uplink-downlink association does not exist for the target downlink subframe, the UE 102 may determine 308 whether the target downlink subframe immediately follows an uplink subframe. In some configurations, this determination 308 may be based on standard uplink subframes. In some configurations, subframe type 2 subframes may or may not be considered uplink subframes for this determination 308.

If an uplink-downlink association does not exist for the target downlink subframe and the target downlink subframe immediately follows an uplink subframe, the UE 102 may convert 310 the target downlink subframe to a special subframe type 2 without a guard period (GP) and without a PDCCH. In this case, the target downlink subframe may be fully converted to an uplink subframe. The UE 102 may transmit data in the special subframe type 2.

If an uplink-downlink association does not exist for the target downlink subframe and the target downlink subframe does not immediately follow an uplink subframe, the UE 102 may convert 312 the target downlink subframe to a special subframe type 2 with a GP and without a PDCCH. For example, the UE 102 may reserve a portion of the special subframe type 2 for a GP. The GP allows the UE 102 to adjust a time advance for uplink transmission. If the uplink and downlink have the same cyclic prefix (CP) configuration, the GP in the special subframe type 2 may have a length of one OFDM symbol. If the uplink and downlink have different cyclic prefix (CP) configurations, the GP may be less than or more than one OFDM symbol. However, to ensure the switch timing, the GP of a special subframe type 2 may have a length of at least $1456 \cdot T_s$.

Figure 4:
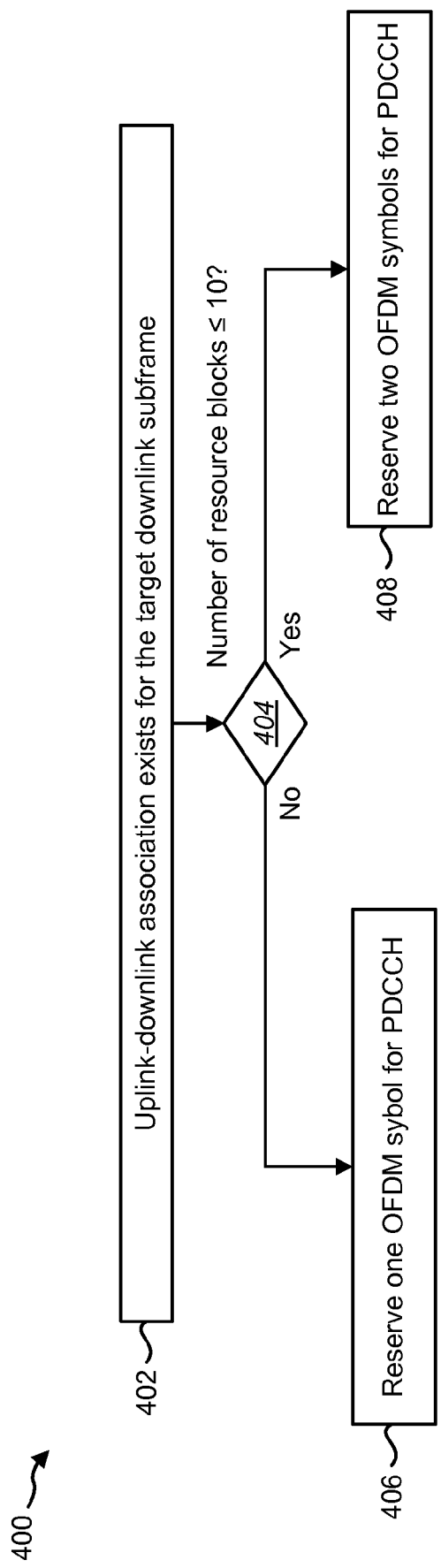
FIG. 4 is a flow diagram illustrating one configuration of a method for determining a length for a physical downlink control channel (PDCCH)

FIG. 4 is a flow diagram illustrating one configuration of a method 400 for determining a length for a physical downlink control channel (PDCCH). For example, FIG. 4 illustrates one approach that may be used when the UE 102 is converting 306 a target downlink subframe to a special subframe type 2 with a PDCCH.

The UE 102 may determine 402 that an uplink-downlink association exists for the target downlink subframe. The UE 102 then determine 404 whether a number of resource blocks (RBs) for the target downlink subframe is less than or equal to 10.

If the number of resource blocks for the target downlink subframe is not less than or equal to 10 (e.g., the number is greater than 10), the UE 102 may reserve 406 one OFDM symbol for the PDCCH. If the number of resource blocks for the target downlink subframe is less than or equal to 10, the UE 102 may reserve 408 two OFDM symbols for the PDCCH. This approach may be considered a "fixed" approach, where a fixed number of symbols are used based on the number of resource blocks for the target downlink subframe. In some configurations, the UE 102 may receive a signal from the eNB 160 indicating that this approach should be used.

Figure 5:
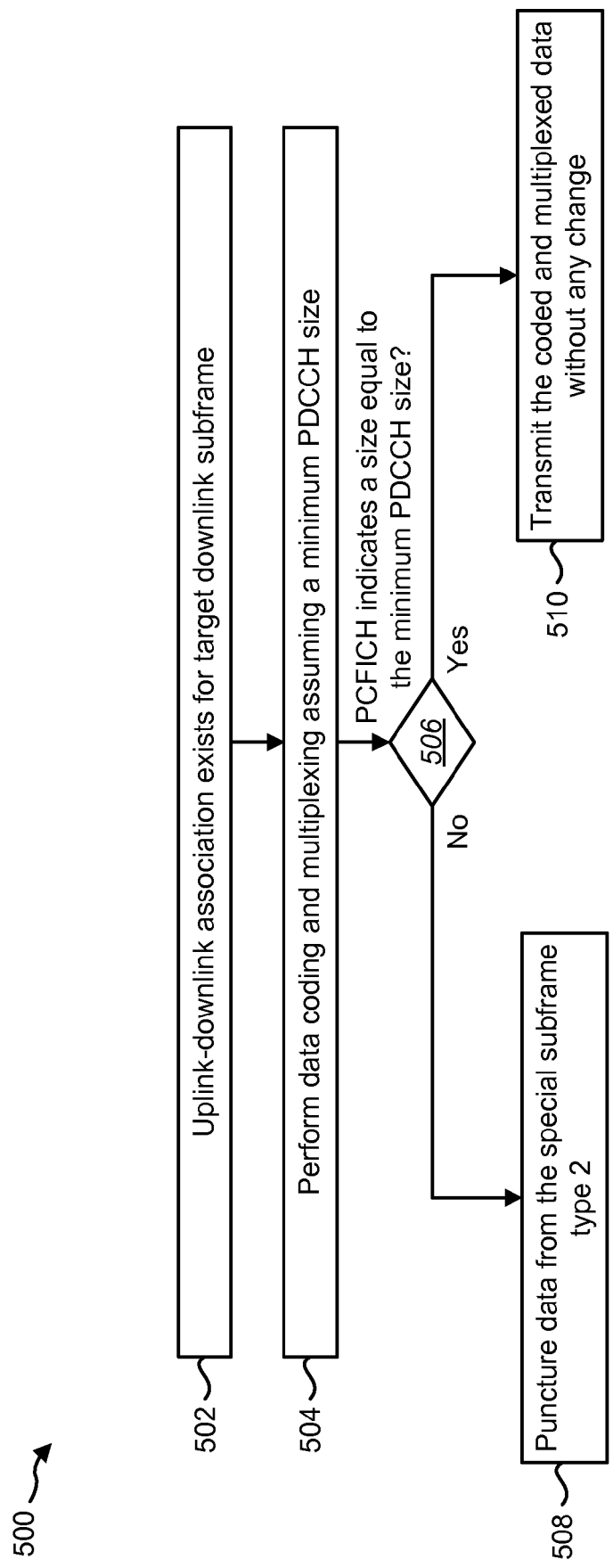
FIG. 5 is a flow diagram illustrating another configuration of a method for determining a length for a physical downlink control channel (PDCCH)

FIG. 5 is a flow diagram illustrating another configuration of a method 500 for determining a length for a physical downlink control channel (PDCCH). For example, FIG. 5 illustrates another approach that may be used when the UE 102 is converting 306 a target downlink subframe to a special subframe type 2 with a PDCCH.

The UE 102 may determine 502 that an uplink-downlink association exists for the target downlink subframe. In the approach illustrated in FIG. 5, the PDCCH length may be determined based on a PCFICH. However, since the PCFICH information (e.g., the length of the PDCCH region) may not be initially known to a UE in a special subframe type 2, the UE 102 may have to process data with a default setting with a minimum PDCCH size. Therefore, the UE 102 may perform 504 data coding and multiplexing assuming a minimum PDCCH size in a special subframe type 2. For example, the UE 102 may assume one OFDM symbol for a PDCCH if the number of RBs for the target downlink subframe is greater than 10, and two OFDM symbols if the number of RBs for the target downlink subframe is smaller than or equal to 10.

Upon detection of the PCFICH in a special subframe type 2, the UE with PUSCH scheduling in the special subframe type 2 may get the number of OFDM symbols for the PDCCH from the PCFICH. The UE 102 may determine 506 whether the PCFICH indicates a size equal to the minimum (assumed) PDCCH size. If the PCFICH indicates the same number of OFDM symbols as are in the assumed minimum PDCCH size, the UE 102 may transmit 510 the coded and multiplexed data without any change.

However, if the PDCCH region given by the PCFICH is larger than the default value, the uplink transmission may use a special subframe type 2 structure determined by the number of OFDM symbols from PCFICH. For example, if the PCFICH indicates a size that is larger than the minimum (assumed) PDCCH size, the UE 102 may puncture 508 data from the special subframe type 2. For instance, the coded and multiplexed data in the OFDM symbol that is emptied out by the selected special subframe type 2 structure may be punctured out. Thus, no PUSCH transmission may occur in the given OFDM symbol.

Figure 6:
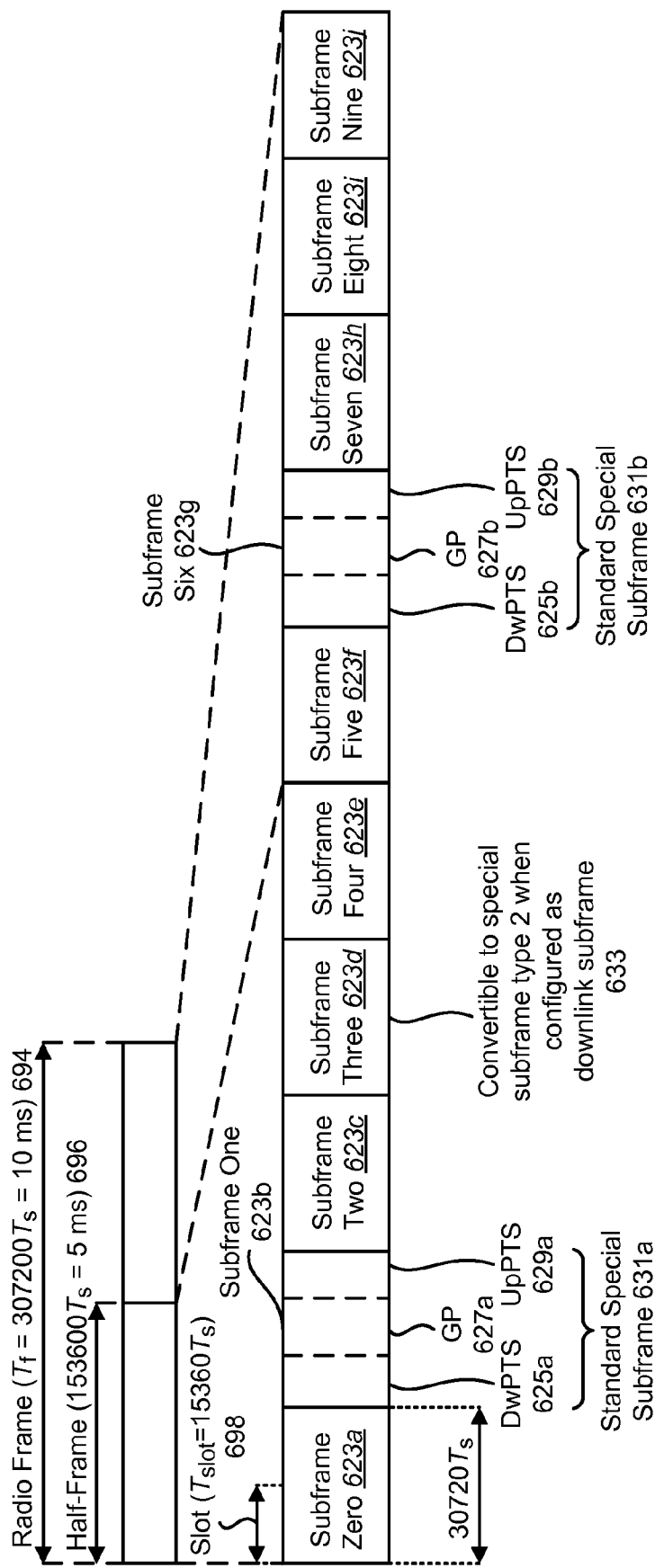
FIG. 6 is a diagram illustrating one example of a radio frame that may be used in accordance with the systems and methods disclosed herein.

FIG. 6 is a diagram illustrating one example of a radio frame 694 that may be used in accordance with the systems and methods disclosed herein. This radio frame 694 structure may be applicable in time-division duplexing (TDD) approaches. Each radio frame 694 may have a length of $T_f = 307200 \cdot T_s = 10$ milliseconds (ms), where $T_f$ is a radio frame 694 duration and $T_s$ is a time unit equal to $$\frac{1}{(15000 \times 2048)}$$

seconds. The radio frame 694 may include two half-frames 696, each having a length of $153600 \cdot T_s = 5$ ms. Each half-frame 696 may include five subframes 623*a-e*, 623*f-j* each having a length of $30720 \cdot T_s = 1$ ms.

In accordance with the systems and methods disclosed herein, some types of subframes 623 that may be used include a downlink subframe, an uplink subframe, a standard special subframe 631 and a special subframe type 2. In the example illustrated in FIG. 6, two standard special subframes 631*a-b* are included the radio frame 694.

The first standard special subframe 631*a* includes a downlink pilot time slot (DwPTS) 625*a*, a guard period (GP) 627*a* and an uplink pilot time slot (UpPTS) 629*a*. In this example, the first standard special subframe 631*a* is included in subframe one 623*b*. The second standard special subframe 631*b* includes a downlink pilot time slot (DwPTS) 625*b*, a guard period (GP) 627*b* and an uplink pilot time slot (UpPTS) 629*b*. In this example, the second standard special subframe 631*b* is included in subframe six 623*g*. The length of the DwPTS 625*a-b* and UpPTS 629*a-b* may be given by Table 4.2-1 of 3GPP TS 36.211 subject to the total length of each set of DwPTS 625, GP 627 and UpPTS 629 being equal to $30720 \cdot T_s = 1$ ms.

Each subframe i 623*a-j* (where i denotes a subframe ranging from subframe zero 623*a* (e.g., 0) to subframe nine 623*j* (e.g., 9) in this example) is defined as two slots, 2i and 2i+1 of length $T_{slot} = 15360 \cdot T_s = 0.5$ ms in each subframe 623. For example, subframe zero (e.g., 0) 623*a* may include two slots, including a first slot 698.

UL-DL configurations with both 5 ms and 10 ms downlink-to-uplink switch-point periodicity may be used in accordance with the systems and methods disclosed herein. FIG. 6 illustrates one example of a radio frame 694 with 5 ms switch-point periodicity. In the case of 5 ms downlink-to-uplink switch-point periodicity, each half-frame 696 includes a standard special subframe 631*a-b*. In the case of 10 ms downlink-to-uplink switch-point periodicity, a special subframe may exist in the first half-frame 696 only.

Subframe zero (e.g., 0) 623*a* and subframe five (e.g., 5) 623*e* and DwPTS 625*a-b* may be reserved for downlink transmission. The UpPTS 629*a-b* and the subframe(s) immediately following the standard special subframe(s) 631*a-b* (e.g., subframe two 623*c* and subframe seven 623*h*) may be reserved for uplink transmission. In a case where multiple cells are aggregated, a UE 102 may assume the same UL-DL configuration across all the cells and that the guard period (GP) of the special subframe(s) in the different cells have an overlap of at least $1456 \cdot T_s$.

One or more of the subframes 623 illustrated in FIG. 6 may be converted to uplink subframes, depending on the UL-DL configuration used. Assuming UL-DL configuration 5 as given in Table (1) above, for example, subframe three (e.g., 3) 623*d* may be convertible to a special subframe type 2 when configured as a downlink subframe 633.

Figure 7:
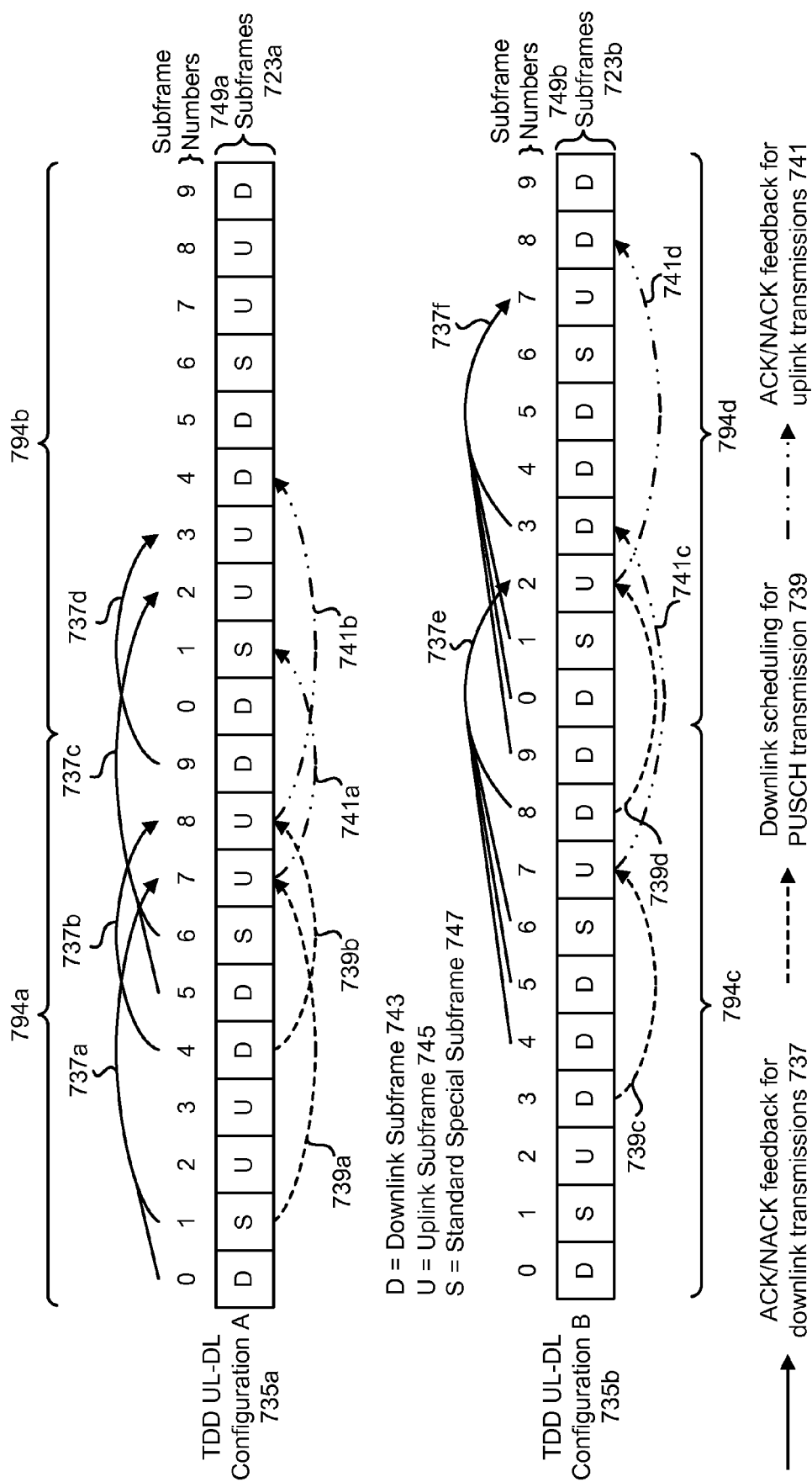
FIG. 7 is a diagram illustrating examples of uplink-downlink associations.

FIG. 7 is a diagram illustrating examples of uplink-downlink associations. A first example of subframes 723*a* in a TDD UL-DL configuration A 735*a* (e.g., UL-DL configuration 1 as given in Table (1) above) illustrates ACK/NACK feedback for downlink transmission associations 737*a-d*, downlink scheduling for PUSCH transmission associations 739*a-b* and ACK/NACK feedback for uplink transmission associations 741*a-b*. Subframe numbers 749*a* for this example are illustrated.

In this example, the ACK/NACK of downlink transmissions in downlink subframe 0 and standard special subframe 1 in a first radio frame 794*a* are reported in the uplink subframe 7 in a first radio frame 794*a*, shown as association 737*a*. The ACK/NACK of downlink transmissions in downlink subframe 4 in a first radio frame 794*a* is reported in the uplink subframe 8 in a first radio frame 794*a*, shown as association 737*b*. Similarly, the ACK/NACK of downlink transmissions in downlink subframe 5 and standard special subframe 6 in a first radio frame 794*a* are reported in the uplink subframe 2 in a second radio frame 794*b*, shown as association 737*c*. The ACK/NACK of downlink transmissions in downlink subframe 9 in a first radio frame 794*a* is reported in the uplink subframe 3 in a second radio frame 794*b*, shown as association 737*d*.

Continuing with the example, the standard special subframe 1 in a first radio frame 794*a* may schedule the PUSCH transmission in the uplink subframe 7 in a first radio frame 794*a*, shown as association 739*a*. The downlink subframe 4 in a first radio frame 794*a* may schedule the PUSCH transmission in the uplink subframe 8 in a first radio frame 794*a*, shown as association 739*b*. Similarly, the standard special subframe 6 in a first radio frame 794*a* may schedule the PUSCH transmission in the uplink subframe 2 in a second radio frame 794*b* (not shown in FIG. 7).

Continuing with the example, the downlink subframe 9 in a first radio frame 794*a* may schedule the PUSCH transmission in an uplink subframe 3 in a second radio frame 794*b* (not shown in FIG. 7). The ACK/NACK of a PUSCH transmission in uplink subframe 7 in a first radio frame 794*a* is reported in the standard special subframe 1 in a second radio frame 794*b*, shown as association 741*a*. The ACK/NACK of a PUSCH transmission in uplink subframe 8 in a first radio frame 794*a* is reported in the downlink subframe 4 in a second radio frame 794*b*, shown as association 741*b*. Similarly, the ACK/NACK of a PUSCH transmission in uplink subframe 2 in a first radio frame 794*a* is reported in the standard special subframe 6 in a first radio frame 794*a* (not shown in FIG. 7). The ACK/NACK of a PUSCH transmission in an uplink subframe 3 in a first radio frame 794*a* is reported in the downlink subframe 9 in a first radio frame 794*a* (not shown in FIG. 7).

A second example of subframes 723*b* in a TDD UL-DL configuration B 735*b* (e.g., UL-DL configuration 2 as given in Table (1) above) illustrates ACK/NACK feedback for downlink transmission associations 737*e-f*, downlink schedule for PUSCH transmission associations 739*c-d* and ACK/NACK feedback for uplink transmission associations 741*c-d*. Subframe numbers 749*b* for this example are illustrated.

In this example, the ACK/NACK of downlink transmissions in downlink subframes 4, 5, 6 and 8 in a third radio frame 794*c* are reported in the uplink subframe 2 in a fourth radio frame 794*d*, shown as association 737*e*. Similarly, the ACK/NACK of downlink transmissions in downlink subframe 9 of a third radio frame 794*c* and downlink subframes 0, 1 and 3 in a fourth radio frame 794*d* are reported in the uplink subframe 7 in a fourth radio frame 794*d*, shown as association 737*f*.

Continuing the example, downlink subframe 3 in a third radio frame 794*c* may schedule a PUSCH transmission in the uplink subframe 7 in a third radio frame 794*c*, shown as association 739*c*. Similarly, downlink subframe 8 in a third radio frame 794*c* may schedule the PUSCH transmission in the uplink subframe 2 in a fourth radio frame 794*d*, shown as association 739*d*.

Continuing the example, the ACK/NACK of a PUSCH transmission in uplink subframe 7 in a third radio frame 794*c* is reported in the downlink subframe 3 in a fourth radio frame 794*d*, shown as association 741*c*. Similarly, the ACK/NACK of a PUSCH transmission in uplink subframe 2 in a fourth radio frame 794*d* is reported in downlink subframe 8 in a fourth radio frame 794*d*, shown as association 741*d*.

In comparing the first example with the second example, it may be observed that even though only one subframe 723 differs in type between the two examples, none of the associations 737, 739, 741 are the same. It should be noted that "D" denotes a downlink subframe 743, "U" denotes an uplink subframe 745 and "S" denotes a standard special subframe 747 in FIG. 7.

Figure 8:
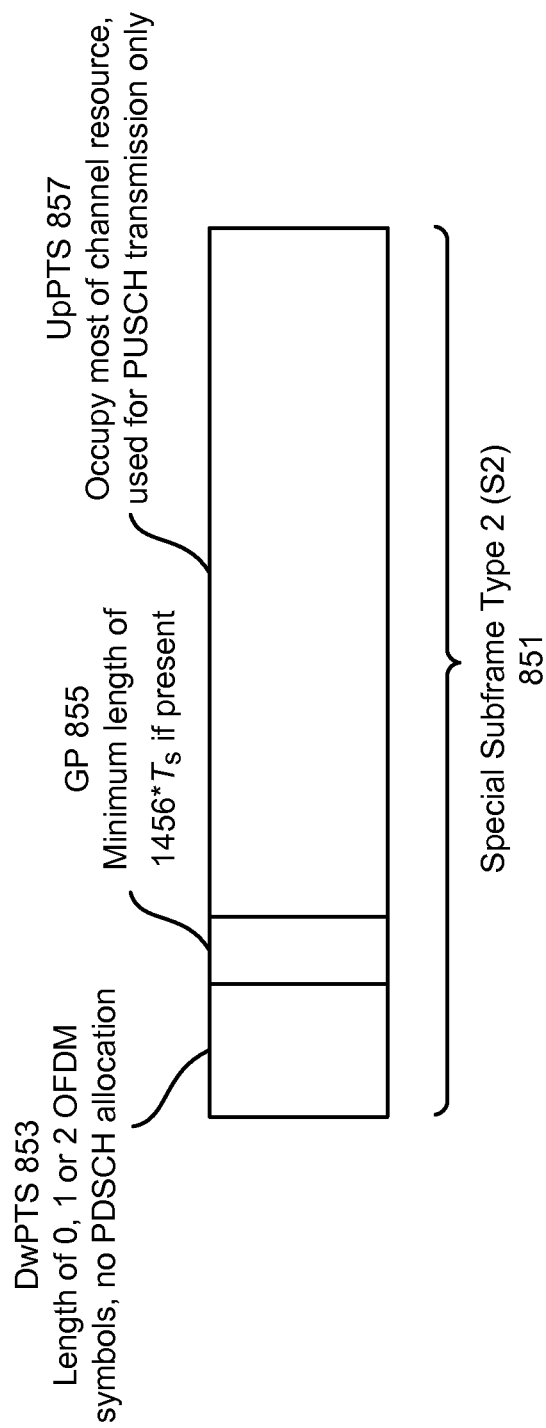
FIG. 8 is a diagram illustrating the structure of a special subframe type 2 (S2)

FIG. 8 is a diagram illustrating the structure of a special subframe type 2 (S2) 851. A standard special subframe (not to be confused with the special subframe type 2 (S2) 851) is used for downlink to uplink switching. In the standard special subframe, a short time may be allocated for uplink (e.g., one or two symbols), while most of the channel resource may be allocated for downlink transmission. However, the special subframe type 2 (S2) 851 may provide more resources for uplink transmission while maintaining all necessary downlink signaling (e.g., control information for PUSCH scheduling and PHICH feedback). A downlink subframe may be converted to a special subframe type 2 (S2) 851 by maintaining only the PDCCH transmission (if any) and allocating the rest of the resources to PUSCH transmission (with a possible guard period 855, for example).

In PUSCH scheduling with a PDCCH DCI format 0, a PUSCH allocation is a block of continuous resource blocks (RBs) represented by the index of the start RB and the number of RBs. The usable resource elements (REs) for each subcarrier in a PUSCH allocation for a special subframe type 2 (S2) 851 may be the same as a number of symbols in an uplink pilot time slot (UpPTS) 857 region.

Similar to a standard special subframe, a special subframe type 2 (S2) 851 may have three fields 853, 855, 857. In a standard special subframe, the three fields are a downlink pilot time slot (DwPTS), a guard period (GP) and an uplink pilot time slot (UpPTS). For convenience, the three fields in the special subframe type 2 (S2) 851 may also be referred to as a DwPTS 853, a GP 855 and a UpPTS 857. Although the three fields in the special subframe type 2 (S2) 851 may be referred to using the same names as in a standard special subframe, it should be noted that the characteristics of the three fields in the special subframe type 2 (S2) 851 may be different from, similar to and/or the same as those of the same-named fields in the standard special subframe.

It should be noted that a special subframe type 2 (S2) 851 may differ from a standard special subframe in that the special subframe type 2 (S2) 851 may replace a downlink subframe (while the standard special subframe may not). The special subframe type 2 (S2) 851 may also carry more data in the UpPTS 857 than a standard special subframe may carry in its UpPTS.

The special subframe type 2 (S2) 851 may provide increased resources for uplink transmission while maintaining necessary downlink signaling. For example, a special subframe type 2 (S2) 851 maintains the PDCCH region as needed, but has no PDSCH allocation. Most of the resources in a special subframe type 2 (S2) 851 are assigned for PUSCH transmissions. Since all uplink control feedback is associated with existing uplink subframes, no PUCCH allocation and PUCCH transmission may be allowed in a special subframe type 2 (S2) 851.

In the special subframe type 2 (S2) 851, a DwPTS 853 may be limited to provide only necessary downlink control signaling (e.g., PDCCH and PHICH). The PDCCH may be used to schedule a PUSCH transmission in an uplink subframe. However, since a PDCCH in a special subframe type 2 (S2) 851 may not schedule a PDSCH transmission, the size of the DwPTS 853 in a special subframe type 2 (S2) 851 may be smaller than a DwPTS in a regular downlink subframe. For example, the number of orthogonal frequency-division multiplexing (OFDM) symbols used for a PDCCH may be limited to one or two when the number of resource blocks in a special subframe type 2 (S2) 851 is greater than 10. Furthermore, the number of OFDM symbols used for a PDCCH may be two when the number of resource blocks in a special subframe type 2 (S2) 851 is smaller than or equal to 10.

A guard period (GP) 855 allows a UE 102 to adjust a time advance for uplink transmission. If the uplink and downlink have the same cyclic prefix (CP) configuration, the GP 855 in a special subframe type 2 (S2) 851 should have a length of one OFDM symbol. If the uplink and downlink have different cyclic prefix (CP) configurations, the GP may be less than or more than one OFDM symbol. However, to ensure the switch timing, the GP 855 (if present) of a special subframe type 2 (S2) 851 (if used) should have a length of at least $1456 \cdot T_s$.

If a downlink subframe does not have an association with PUSCH scheduling, power control and PHICH feedback to any uplink transmissions in the current UL-DL configuration, the downlink subframe may be converted to a special subframe type 2 (S2) 851 with no reserved PDCCH region (e.g., a DwPTS 853 length of 0). If a downlink subframe does not have an association with PUSCH scheduling, power control and PHICH feedback to any uplink transmissions in the current UL-DL configuration, and the downlink subframe is immediately after an uplink subframe (or possibly after a special subframe type 2 (S2) 851 in some configurations), the downlink subframe can be fully converted to an uplink subframe with no GP 855. If a downlink subframe does not have an association with PUSCH scheduling, power control and PHICH feedback to any uplink transmissions in the current UL-DL configuration, and the downlink subframe to be converted is after a downlink subframe, the first OFDM symbol length may be reserved as a GP 855, while all other OFDM symbols may be allocated for uplink transmission, for example.

In one configuration of the special subframe type 2 (S2) 851, the length of the DwPTS 853 and the length of the UpPTS 857 are given by Table (5), subject to the total length of DwPTS 853, GP 855 and UpPTS 857 being equal to $30720 \cdot T_s = 1$ ms. More detail on the structure of a special subframe type 2 (S2) 851 is given below.

TABLE (5)

| Number of OFDM symbols reserved for PDCCH | Normal CP in downlink | | | Extended CP in downlink | | |
|---|---|---|---|---|---|---|
| | | UpPTS 857 | | | UpPTS 857 | |
| | DwPTS 853 | Normal CP in uplink | Extended CP in uplink | DwPTS 853 | Normal CP in uplink | Extended CP in uplink |
| 0, no GP | 0 | $30720 \cdot T_s$ | $30720 \cdot T_s$ | 0 | $30720 \cdot T_s$ | $30720 \cdot T_s$ |
| 0, with GP | 0 | $28528 \cdot T_s$ | $28160 \cdot T_s$ | 0 | $28528 \cdot T_s$ | $28160 \cdot T_s$ |
| 1 | $2192 \cdot T_s$ | $26336 \cdot T_s$ | $25600 \cdot T_s$ | $2560 \cdot T_s$ | $26336 \cdot T_s$ | $25600 \cdot T_s$ |
| 2 | $4384 \cdot T_s$ | $24144 \cdot T_s$ | $23040 \cdot T_s$ | $5120 \cdot T_s$ | $24144 \cdot T_s$ | $23040 \cdot T_s$ |

Table (6) below provides the same configuration in terms of numbers of OFDM symbols. If one OFDM symbol is used for a PDCCH, the UpPTS 857 may have 12 OFDM symbols if a normal cyclic prefix (CP) is configured for uplink transmission, or 10 OFDM symbols if an extended CP is configured for uplink transmission. If two OFDM symbols are used for a PDCCH, the UpPTS 857 may have 11 OFDM symbols if a normal CP is configured for uplink transmission, or 9 OFDM symbols if an extended CP is configured for uplink transmission. For a special subframe type 2 (S2) 851 with no reserved PDCCH region (e.g., a DwPTS 853 length of 0), if the target downlink subframe (e.g., the downlink subframe to be converted) is directly after an uplink subframe, all symbols are used for uplink allocation. However, if the target downlink subframe is after a downlink subframe, the first OFDM symbol length may be reserved as GP 855, while all other OFDM symbols may be allocated for uplink transmission.

TABLE (6)

| Number of OFDM symbols reserved for PDCCH | Normal CP in downlink | | | Extended CP in downlink | | |
|---|---|---|---|---|---|---|
| | | UpPTS | | | UpPTS | |
| | DwPTS | Normal CP in uplink | Extended CP in uplink | DwPTS | Normal CP in uplink | Extended CP in uplink |
| 0, no GP | 0 OFDM symbols | 14 OFDM symbols | 12 OFDM symbols | 0 OFDM symbols | 14 OFDM symbols | 12 OFDM symbols |
| 0, with GP | 0 OFDM symbols | 13 OFDM symbols | 11 OFDM symbols | 0 OFDM symbols | 13 OFDM symbols | 11 OFDM symbols |
| 1 | 1 OFDM symbol | 12 OFDM symbols | 10 OFDM symbols | 1 OFDM symbol | 12 OFDM symbols | 10 OFDM symbols |
| 2 | 2 OFDM symbols | 11 OFDM symbols | 9 OFDM symbols | 2 OFDM symbols | 11 OFDM symbols | 9 OFDM symbols |

Figure 9:
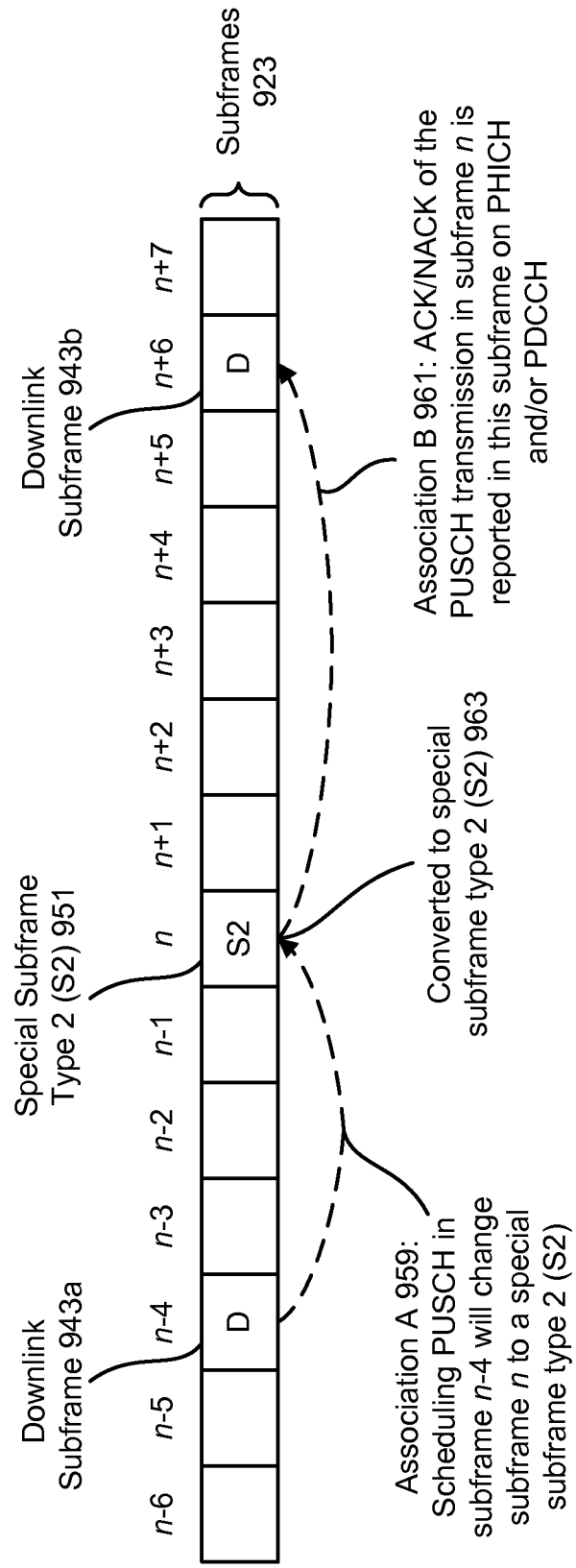
FIG. 9 is a diagram illustrating one example of downlink subframe conversion in accordance with the systems and methods disclosed herein.

FIG. 9 is a diagram illustrating one example of downlink subframe conversion in accordance with the systems and methods disclosed herein. More specifically, FIG. 9 illustrates several subframes 923 in which a subframe n (that was previously a downlink subframe) may be converted to a special subframe type 2 (S2) 963. Additionally, FIG. 9 illustrates special subframe type 2 (S2) conversion rules and PHY layer signaling.

In accordance with the systems and methods disclosed herein, a downlink subframe may be converted to a special subframe type 2 (S2) 963. This may occur, for example, when one or more DCI format 0 PUSCH transmissions are allocated in a downlink subframe (that is not allowed to have DCI format 0 for PUSCH assignment in current 3GPP Release 8, 9 and 10 specifications), or when PHICH feedback is required for a previously allocated special subframe type 2.

Associations for a special subframe type 2 (S2) 951 may be specified as follows. For a given UL-DL configuration, a downlink subframe n−4 may not have associations with PUSCH scheduling and PHICH or PDCCH feedback for uplink transmissions. The downlink subframe n−4 (e.g., a downlink subframe 943a including a PDCCH with DCI format 0) may convert a downlink subframe n 963 (that was previously a downlink subframe, for example) to a special subframe type 2 (S2) 951. For instance, association A 959 specifies that scheduling a PUSCH in a subframe n−4 (e.g., downlink subframe 943a) may convert subframe n to a special subframe type 2 (S2) 951. Subframe n may be converted to a special subframe type 2 (S2) 951 following control information in subframe n−4. One or more UEs 102 with a PUSCH allocation may transmit in subframe n.

The ACK/NACK feedback for a special subframe type 2 with subframe number n may be reported in subframe n+6 (e.g., downlink subframe 943b). For instance, association B 961 specifies that ACK/NACK for a special subframe type 2 (S2) 951 may be reported in subframe n+6. It should be noted that this associations 959, 961 may apply over radio frame boundaries.

In one configuration, the ACK/NACK for PUSCH transmission in a converted subframe n may be carried on a PHICH in downlink subframe n+6. Optionally, the PDCCH in a subframe n+6 may override the PHICH and schedule a new data transmission or a retransmission in a subframe n+10 by indicating whether this is new transmission or not.

In another configuration, there may be no PHICH for PUSCH transmission in the converted subframe n and a UE 102 may consider a PHICH value as an ACK. Furthermore, the PDCCH in subframe n+6 may override the ACK and schedule a new data transmission or a retransmission in subframe n+10 by indicating whether this is new transmission or not. Scheduling a retransmission may indicate a NACK for the previous PUSCH transmission. If the UE 102 does not detect any PDCCH, the UE 102 may not transmit a PUSCH in subframe n+10. Since TDD may have a common interval of 10 for both 5 ms and 10 ms configurations, n+6=(n−4)+10, the PHICH and PDCCH allocation with DCI format 0 may always have the same downlink subframe index number.

In other words, the PUSCH of a special subframe type 2 (S2) 951 with subframe number n may be scheduled in the PDCCH or a PHICH feedback of a downlink subframe that is four subframes before the special subframe type 2 (S2) 951 (e.g., a downlink subframe 943a with subframe number n−4 with no existing associations on PUSCH scheduling and ACK/NACK feedback for PUSCH transmission in a standard configuration). The ACK/NACK feedback of the PUSCH transmission in a special subframe type 2 (S2) 951 with subframe number n may be reported on a PHICH or by explicit PDCCH scheduling in a downlink subframe 943b with subframe number n+6.

In some configurations, n may denote a current subframe in a cycling set of subframe numbers or indices i. The subframe numbers or indices i may range from 0 to 9, where each cycle corresponds to a radio frame. Thus, if a number k is added to or subtracted from n that is beyond the range of a cycle of i (e.g., 0≤i≤9), the result may specify a subframe in a different radio frame. For instance, n+k=i, where n=9 and k=4, may specify a subframe i=3 in a radio frame following the current radio frame. In other words, the index can be represented by a modular function, mod(n+k)=i, where if (n+k)=i, they are in the same radio frame. If (n+k)≥10, i=mod(n+k)=n+k−10, where subframe index i is in the radio frame following the current radio frame.

In accordance with the example illustrated in FIG. 9, the eNB 160 may transmit and the UE(s) 102 may receive PHY layer signaling in the downlink subframe 943a that is four subframes before the target downlink subframe that is converted to the special subframe type 2 (S2) 951. One or more UEs 102 and optionally the eNB 160 may transmit (and/or receive) data in the special subframe type 2 (S2) 951. The eNB 160 may transmit and the UE(s) 102 may receive ACK/NACK data in the downlink subframe 943b that is six subframes after the target downlink subframe that is converted to the special subframe type 2 (S2) 951. The ACK/NACK data may correspond to data transmitted from the UE(s) 102 to the eNB 160 in the special subframe type 2 (S2) 951.

Figure 10:
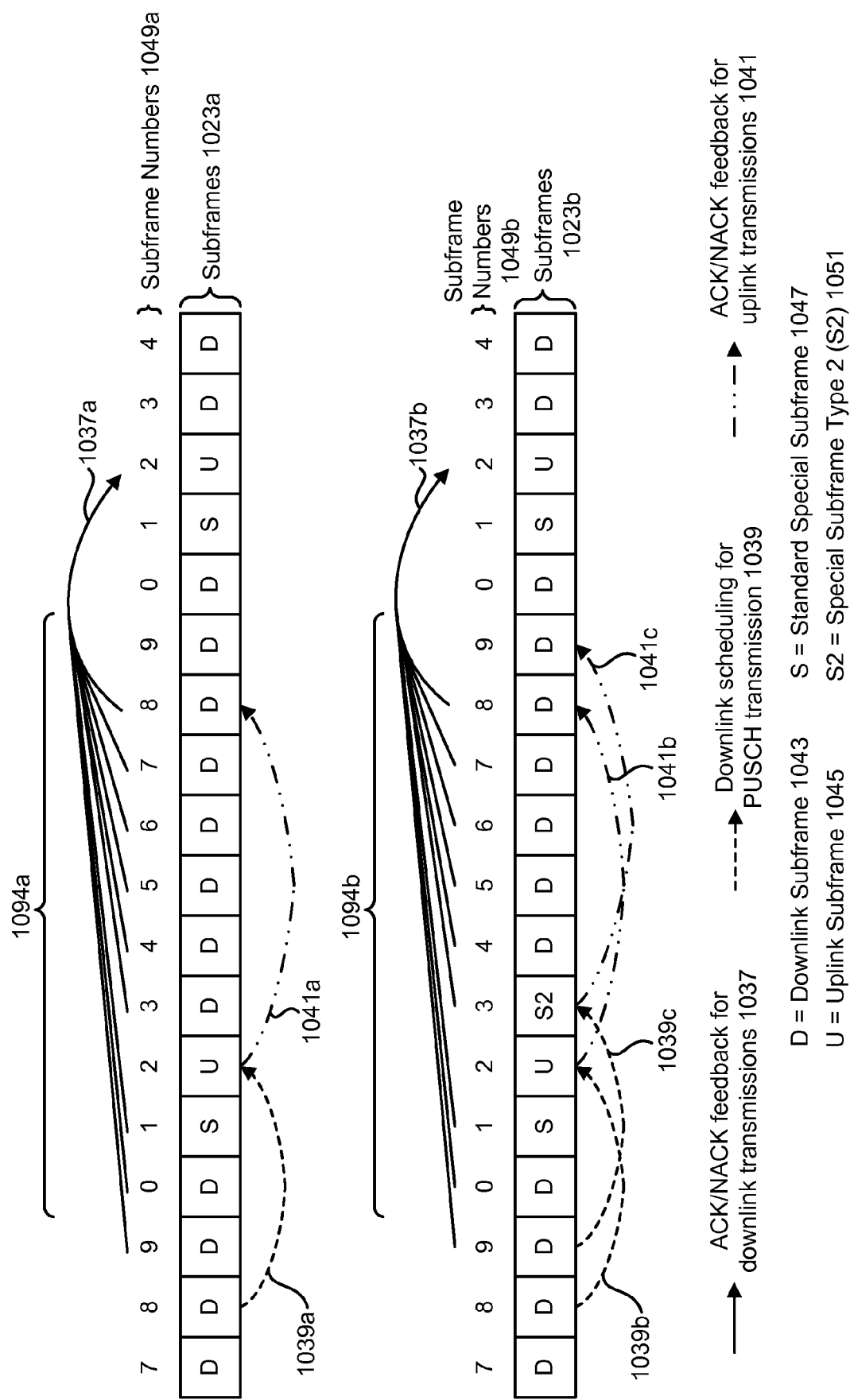
FIG. 10 is a diagram illustrating another example of downlink subframe conversion in accordance with the systems and methods disclosed herein.

FIG. 10 is a diagram illustrating another example of downlink subframe conversion in accordance with the systems and methods disclosed herein. It should be noted that "D" denotes a downlink subframe 1043, "U" denotes an uplink subframe 1045, "S" denotes a standard special subframe 1047 and "S2" denotes a special subframe type 2 (S2) 1051 in FIG. 10.

In this example, an uplink and downlink (UL-DL) configuration 5 (as given in Table (1) above) is used in a first set of subframes 1023a without downlink subframe conversion and in a second set of subframes 1023b with downlink subframe conversion. In configuration 5, there is only one uplink subframe 1045 at each subframe number i=2 according to the subframe numbers 1049a-b corresponding to the first and second set of subframes 1023a-b.

In both sets of subframes 1023a-b, a PUSCH allocation is signaled by PDCCH DCI format 0 or a PHICH feedback in subframe number i=8 of frames previous to current frames 1094a-b. For example, downlink scheduling for PUSCH transmission associations 1039a-b are illustrated in both sets of subframes 1023a. All other downlink subframes may not carry PDCCH DCI format 0 or PHICH feedback in configuration 5 according to current 3GPP specifications (e.g., Releases 8, 9 and 10).

However, in accordance with the systems and methods disclosed herein, if a PDCCH DCI format 0 is assigned in subframe number i=9 of a previous frame to schedule a PUSCH transmission (or acknowledge a PUSCH transmission on a PHICH) in a downlink subframe 1043 number i=3, the downlink subframe 1043 number i=3 of the current frame 1094b may be converted to a special subframe type 2 (S2) 1051. Thus, a downlink scheduling for PUSCH transmission association 1039c may be used. A PUSCH transmission may be carried on the allocated PUSCH resource.

As illustrated in FIG. 10, ACK/NACK feedback for uplink transmission associations 1041a-b may be used for the uplink subframe number i=2 to specify that corresponding ACK/NACK information may be communicated in downlink subframe 1043 number i=8 in both sets of subframes 1023a-b. In the second set of subframes 1023b, the ACK/NACK of the PUSCH transmission in the special subframe type 2 (S2) 1051) may be reported on the subframe number i=9 according to an ACK/NACK feedback for uplink transmissions 1041c.

The conversion to a special subframe type 2 (S2) 1051 from a downlink subframe 1043 may be temporary and dynamic. In some configurations, a downlink subframe 1043 may be converted to a special subframe type 2 (S2) 1051 only under the above conditions. Otherwise, it works as a regular downlink subframe 1043. Thus, the conversion and transition may happen autonomously and no extra signaling is necessary.

Legacy UEs that do not expect a special subframe may treat the special subframe type 2 (S2) 1051 as a normal downlink subframe 1043. When the PDCCH is present in a special subframe type 2 (S2) 1051, there is no change for legacy UEs. When the PDCCH is not present in a special subframe type 2 (S2) 1051, the legacy UEs may report a DTX for the subframe because they cannot detect a PDCCH successfully. Release-11 and beyond UEs 102 may perform the required uplink-downlink association and data transmission in a special subframe type 2 (S2) 1051 in accordance with the systems and methods disclosed herein.

The systems and methods disclosed herein may provide downlink subframe 1043 conversion to a special subframe type 2 (S2) 1051 while maintaining existing (according to 3GPP Releases 8, 9 and 10, for example) associations 1037, 1039, 1041. For example, the ACK/NACK feedback for downlink transmission associations 1037b in the second set of subframes 1023b with the special subframe type 2 (S2) 1051) are the same as the ACK/NACK feedback for downlink transmission associations 1037a in the first set of subframes 1023a. Similarly, existing downlink scheduling for PUSCH transmission associations 1039a, 1039b and ACK/NACK feedback for uplink transmission associations 1041a, 1041b may be maintained.

Figure 11:
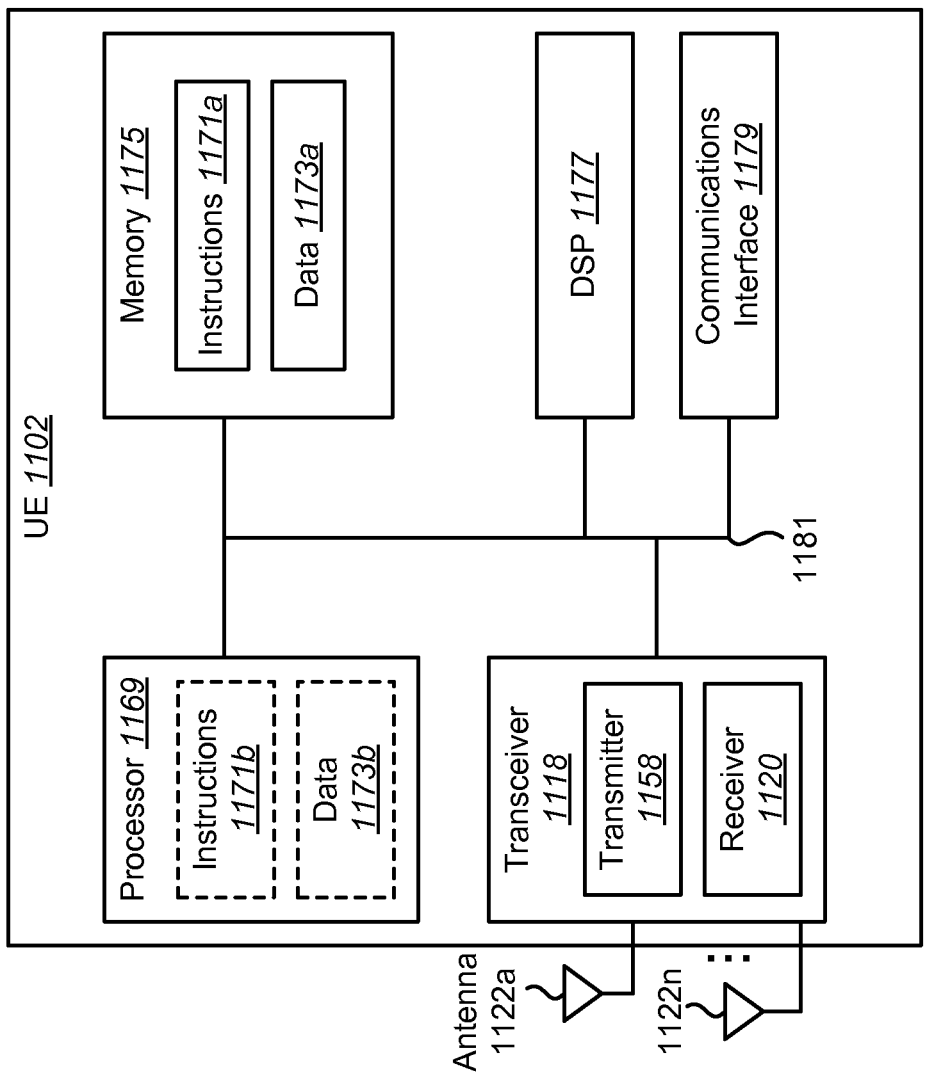
FIG. 11 illustrates various components that may be utilized in a user equipment (UE)

FIG. 11 illustrates various components that may be utilized in a user equipment (UE) 1102. The UE 1102 may be utilized as the UE 102 described above. The UE 1102 includes a processor 1169 that controls operation of the UE 1102. The processor 1169 may also be referred to as a CPU. Memory 1175, which may include read-only memory (ROM), random access memory (RAM), a combination of the two or any type of device that may store information, provides instructions 1171a and data 1173a to the processor 1169. A portion of the memory 1175 may also include non-volatile random access memory (NVRAM). Instructions 1171b and data 1173b may also reside in the processor 1169. Instructions 1171b and/or data 1173b loaded into the processor 1169 may also include instructions 1171a and/or data 1173a from memory 1175 that were loaded for execution or processing by the processor 1169. The instructions 1171b may be executed by the processor 1169 to implement one or more of the methods 300, 400, 500 disclosed herein.

The UE 1102 may also include a housing that contains one or more transmitters 1158 and one or more receivers 1120 to allow transmission and reception of data. The transmitter(s) 1158 and receiver(s) 1120 may be combined into one or more transceivers 1118. One or more antennas 1122a-n are attached to the housing and electrically coupled to the transceiver 1118.

The various components of the UE 1102 are coupled together by a bus system 1181, which may include a power bus, a control signal bus and a status signal bus, in addition to a data bus. However, for the sake of clarity, the various buses are illustrated in FIG. 11 as the bus system 1181. The UE 1102 may also include a digital signal processor (DSP) 1177 for use in processing signals. The UE 1102 may also include a communications interface 1179 that provides user access to the functions of the UE 1102. The UE 1102 illustrated in FIG. 11 is a functional block diagram rather than a listing of specific components.

Figure 12:
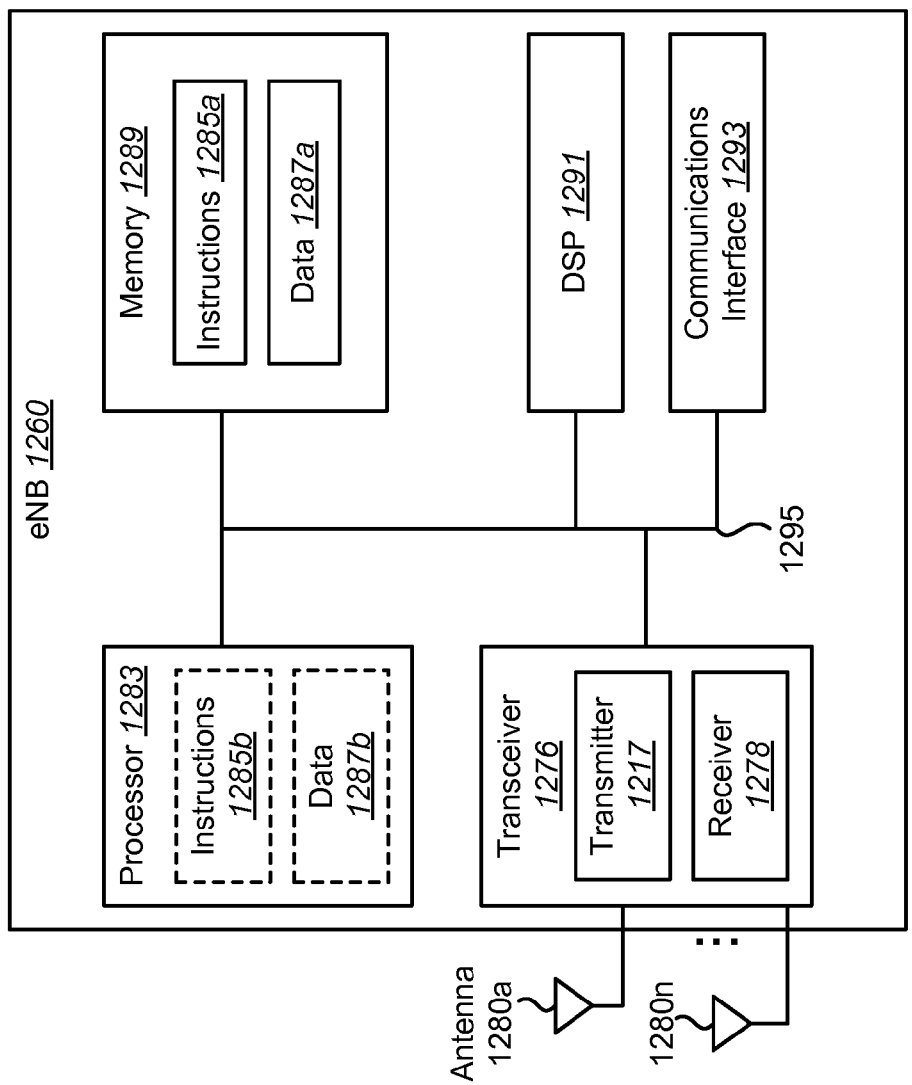
FIG. 12 illustrates various components that may be utilized in an evolved Node B (eNB).

FIG. 12 illustrates various components that may be utilized in an evolved Node B (eNB) 1260. The eNB 1260 may be utilized as the eNB 160 described previously. The eNB 1260 may include components that are similar to the components discussed above in relation to the UE 1102, including a processor 1283, memory 1289 that provides instructions 1285a and data 1287a to the processor 1283, instructions 1285b and data 1287b that may reside in or be loaded into the processor 1283, a housing that contains one or more transmitters 1217 and one or more receivers 1278 (which may be combined into one or more transceivers 1276), one or more antennas 1280a-n electrically coupled to the transceiver(s) 1276, a bus system 1295, a DSP 1291 for use in processing signals, a communications interface 1293 and so forth. The instructions 1285b may be executed by the processor 1283 to implement the method 200 disclosed herein.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. An evolved Node B (eNB) configured for converting a downlink subframe, comprising:
 a processor;
 memory in electronic communication with the processor;
 instructions stored in the memory and executed by the processor, the instructions being executable to cause the processor to:
 transmit physical (PHY) layer signaling to convert the downlink subframe to a special subframe type 2, wherein the special subframe type 2 comprises at least an uplink pilot time slot (UpPTS).

2. The eNB of claim 1, wherein the special subframe type 2 further comprises a downlink pilot time slot (DwPTS).

3. The eNB of claim 1, wherein the instructions are further executable to:
 determine whether the downlink subframe immediately follows an uplink subframe; and
 determine the subframe structure of the special subframe type.

4. The eNB of claim 1, wherein the instructions are further executable to transmit Acknowledgement and Negative Acknowledgement (ACK/NACK) data in a subframe that is a number of subframes after the target downlink subframe.

5. A User Equipment (UE) configured for receiving a signal, comprising:
 a processor;
 memory in electronic communication with the processor;
 instructions stored in the memory and executed by the processor, the instructions being executable to cause the processor to:
 convert a target downlink subframe to a special subframe type 2, wherein the special subframe type 2 comprises a downlink pilot time slot (DwPTS).

6. A User Equipment (UE) configured for receiving a signal, comprising:
 a processor;
 memory in electronic communication with the processor;
 instructions stored in the memory and executed by the processor, the instructions being executable to cause the processor to:
 convert a target downlink subframe to a special subframe type 2;
 determine whether the target downlink subframe immediately follows an uplink subframe; and
 determine the subframe structure of the special subframe type 2.

7. A method for converting a downlink subframe, comprising:
 determining whether to convert a target downlink subframe to a special subframe type 2, wherein the special subframe type 2 comprises at least an uplink pilot time slot (UpPTS); and
 transmitting physical (PHY) layer signaling to convert the downlink subframe to a special subframe type 2 where the special subframe type 2 further comprises a downlink pilot time slot (DwPTS).

8. The method of claim 7, wherein the special subframe type 2 further comprises a downlink pilot time slot (DwPTS).

9. The method of claim 7, wherein the method further comprises:
   determining the subframe structure of the special subframe type 2 based on whether the target downlink subframe immediately follows an uplink subframe.

10. The method of claim 7, wherein the method further comprises transmitting Acknowledgement and Negative Acknowledgement (ACK/NACK) data in a subframe that is a number of subframes after the target downlink subframe.

11. A method for receiving a signal, comprising:
   receiving physical (PHY) layer signaling to convert a downlink subframe to a special subframe type 2, wherein the special subframe type 2 comprises at least an uplink pilot time slot (UpPTS); and
   converting a target downlink subframe to the special subframe type 2.

12. The method of claim 11, wherein the special subframe type 2 further comprises a downlink pilot time slot (DwPTS).

13. The method of claim 11, wherein if an uplink-downlink association does not exist for the target downlink subframe, the method further comprises:
   determining whether the target downlink subframe immediately follows an uplink subframe; and
   determining the subframe structure of the special subframe type.

14. The method of claim 11, wherein the method further comprises receiving Acknowledgement and Negative Acknowledgement (ACK/NACK) data in a subframe that is a number of subframes after the target downlink subframe.

* * * * *